United States Patent
Byrd

(10) Patent No.: US 10,453,434 B1
(45) Date of Patent: Oct. 22, 2019

(54) SYSTEM FOR SYNTHESIZING SOUNDS FROM PROTOTYPES

(71) Applicant: John William Byrd, Santa Ana, CA (US)

(72) Inventor: John William Byrd, Santa Ana, CA (US)

(*) Notice: Subject to any disclaimer, the term of this patent is extended or adjusted under 35 U.S.C. 154(b) by 0 days.

(21) Appl. No.: 15/980,753

(22) Filed: May 16, 2018

Related U.S. Application Data

(60) Provisional application No. 62/506,625, filed on May 16, 2017.

(51) Int. Cl.
| | |
|---|---|
| *G10H 1/00* | (2006.01) |
| *G10L 25/03* | (2013.01) |
| *G06F 16/632* | (2019.01) |
| *G06N 7/00* | (2006.01) |
| *G06F 7/58* | (2006.01) |
| *G06F 3/0482* | (2013.01) |

(52) U.S. Cl.
CPC ......... *G10H 1/0025* (2013.01); *G06F 3/0482* (2013.01); *G06F 7/582* (2013.01); *G06F 16/632* (2019.01); *G06N 7/00* (2013.01); *G10L 25/03* (2013.01)

(58) Field of Classification Search
CPC . G06F 3/16; G06F 3/162; G06F 3/165; G06F 3/167; G06F 17/30743; G06F 17/30787; G06F 17/30746; G06F 17/30761; G06F 17/30769; G06F 17/30026; G06F 17/30755; G10H 1/0025; G10H 1/45; G10H 2210/031–2210/091; G10H 2240/141; G10H 2240/151; G10H 2220/126; G10L 25/03; G10L 15/08
See application file for complete search history.

(56) References Cited

U.S. PATENT DOCUMENTS

| | | | |
|---|---|---|---|
| 4,729,044 A | 3/1988 | Kiesel | |
| 5,350,880 A | 9/1994 | Sato | |
| 5,633,985 A | 5/1997 | Severson et al. | |
| 5,693,902 A | 12/1997 | Hufford et al. | |

(Continued)

FOREIGN PATENT DOCUMENTS

| | | |
|---|---|---|
| WO | WO 99/16049 | 4/1999 |
| WO | WO 2012-140468 | 10/2012 |

OTHER PUBLICATIONS

Alani, Ahmmed and Mohamed Deriche, A Novel Approach to Speech Segmentation Using the Wavelet Transform, Fifth International Symposium on Signal Processing and its Applications, ISSPA '99, Brisbane.

Casey, Michael Anthony, Auditory Group Theory with Applications to Statistical Bias Methods for Structured Audio, Ph. D. thesis at Massachusetts Institute of Technology, Feb. 1998.

Cont, Arshia et al., Guidage: A Fast Audio Query Guided Assemblage, Proceedings of International Computer Music Conference (ICMC), Copenhagen 2007.

(Continued)

*Primary Examiner* — Andrew C Flanders
(74) *Attorney, Agent, or Firm* — Eric E. Kaprelian; Joseph S. Heino

(57) ABSTRACT

A system is presented for generation of output sounds having psychoacoustic qualities comparable to input sound or sounds. Short term and intermediate term features are computed for each input sound, sound components are clustered, filtered, and scored; and a prediction learning system is trained on the probabilities of classes of regions over time. A decoder can make use of this information to generate outputs that sound similar to, but not the same as, the input sound or sounds. The method and apparatus can be operated with no special training.

17 Claims, 15 Drawing Sheets

(56) References Cited

U.S. PATENT DOCUMENTS

| | | | |
|---|---|---|---|
| 5,728,962 A | 3/1998 | Goede | |
| 5,749,073 A | 5/1998 | Slaney | |
| 5,808,222 A | 9/1998 | Yang | |
| 5,973,252 A | 10/1999 | Hildebrand | |
| 6,150,598 A | 11/2000 | Suzuki et al. | |
| 6,230,140 B1 | 5/2001 | Severson et al. | |
| 6,281,421 B1* | 8/2001 | Kawaguchi | G10H 1/0025 84/603 |
| 6,683,241 B2 | 1/2004 | Wieder | |
| 7,042,472 B2 | 5/2006 | Sapp | |
| 7,319,185 B1 | 1/2008 | Wieder | |
| 7,732,697 B1* | 6/2010 | Wieder | G10H 1/0025 84/609 |
| 7,737,354 B2 | 6/2010 | Basu et al. | |
| 8,487,176 B1 | 7/2013 | Wieder | |
| 9,147,388 B2* | 9/2015 | Uemura | G10H 7/04 |
| 2001/0029831 A1* | 10/2001 | Tsutsumi | G10H 1/0025 84/604 |
| 2002/0134220 A1* | 9/2002 | Yamane | G06F 17/30017 84/609 |
| 2003/0070538 A1 | 4/2003 | Sugiyama et al. | |
| 2007/0038455 A1 | 2/2007 | Murzina et al. | |
| 2007/0185909 A1 | 8/2007 | Klein et al. | |
| 2007/0186752 A1* | 8/2007 | Georges | G10H 1/0025 84/609 |
| 2008/0235268 A1* | 9/2008 | Miyoshi | G11B 27/036 |
| 2009/0019995 A1* | 1/2009 | Miyajima | G10H 1/0025 84/625 |
| 2009/0272253 A1* | 11/2009 | Yamashita | G10H 1/0025 84/611 |
| 2013/0018496 A1* | 1/2013 | Littlejohn | G11B 27/034 700/94 |
| 2013/0340594 A1* | 12/2013 | Uemura | G10H 7/04 84/605 |
| 2014/0121797 A1* | 5/2014 | Ales | G11B 20/10 700/94 |
| 2014/0195025 A1* | 7/2014 | Wieder | G06F 21/10 700/94 |

OTHER PUBLICATIONS

Cope, David, Experiments in Music Intelligence, Proceedings of the International Computer Music Conference, Champaign, Illinois, United States, 1987.

Davis, Steven B. and Paul Mermelstein, Comparison of Parametric Representations for Monosyllabic Word Recognition in Continuously Spoken Sentences, IEEE Transactions on Acoustics, Speech and Signal Processing, vol. ASSP-28, No. 4, Aug. 1980.

Hoskinson, Reynald and Dinesh Pai, Manipulation and Resynthesis with Natural Grains, Proceedings of the International Computer Music Conference, Havana 2001.

Muda, Lindasalwa et al., Voice Recognition Algorithms using Mel Frequency Cepstral Coefficient (MFCC) and Dynamic Time Warping (DTW) Techniques, Journal of Computing, vol. 2, Issue 3, pp. 138-143, Mar. 2010.

Jehan, Tristan, Creating Music by Listening, Ph. D thesis at Massachusetts Institute of Technology, Sep. 2005.

Sakurai, Yasushi et al., FTW: Fast Similarity Search under the Time Warping Distance, Proceedings of the twenty-fourth ACM SIGMOD-SIGACT-SIGART Symposium on Principles of Database Systems, pp. 326-327, 2005.

Salvador, Stan and Philip Chan, Toward accurate dynamic time warping in linear time and space, Journal of Intelligent Data Analysis, vol. 11, Issue 5, pp. 561-580, Oct. 2007.

Schwarz, Diemo, Distance Mapping for Corpus-Based Concatenative Synthesis, URM STMS Ircam, Sound and Music Computing, Padova, 2011.

Schwarz, Diemo, Concatenative Sound Synthesis: The Early Years, Journal of New Music Research, vol. 35, Issue 1, 2006.

Schwarz, Diemo, Principles and Applications of Interactive Corpus-Based Concatenative Synthesis, Ircam—Centre Pompidou, 2008.

Schwarz, Diemo, The CATERPILLAR System for Data-Driven Concatenative Sound Synthesis, Proceedings of the Sixth International Conference on Digital Audio Effects, London, 2003.

Slaney, Malcolm, Auditory Toolbox Version 2: Technical Report #1998-010, Interval Research Corporation.

* cited by examiner

SYSTEM FOR SYNTHESIZING SOUNDS FROM PROTOTYPES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

This application relates to the digital synthesis of sounds, particularly the synthesis of sound variations from prototypes of existing sounds.

The following is a tabulation of some art that presently appears relevant:

| U.S. Patents | | | |
|---|---|---|---|
| Patent Number | Kind Code | Publication Date | Patentee |
| 4,729,044 | A | 1988 Mar. 1 | Kiesel |
| 5,350,880 | A | 1994 Sept. 27 | Sato |
| 5,633,985 | A | 1997 May 27 | Severson et al |
| 5,693,902 | A | 1997 Dec. 2 | Hufford et al. |
| 5,728,962 | A | 1998 Mar. 17 | Goede |
| 5,749,073 | A | 1998 May 5 | Slaney |
| 5,808,222 | A | 1998 Sept. 15 | Yang |
| 5,973,252 | A | 1999 Oct. 26 | Hildebrand |
| 6,150,598 | A | 2000 Nov. 21 | Suzuki et al. |
| 6,230,140 | B1 | 2001 May 8 | Severson et al |
| 8,487,176 | B1 | 2001 Nov. 6 | Wieder |
| 6,683,241 | B2 | 2004 Jan. 27 | Wieder |
| 7,042,472 | B2 | 2006 May 9 | Sapp |
| 7,319,185 | B1 | 2008 Jan. 15 | Wieder |
| 7,737,354 | B2 | 2010 Jun. 15 | Basu |

| U.S. Patent Application Publication | | | |
|---|---|---|---|
| Publication Nr. | Kind Code | Publication Date | Applicant |
| 2003/0070538 | A1 | 2003 Apr. 17 | Sugiyama et al. |
| 2007/0038455 | A1 | 2007 Feb. 15 | Murzina et al. |
| 2007/0185909 | A1 | 2007 Aug. 9 | Klein et al. |

| Foreign Patent Documents | | | | |
|---|---|---|---|---|
| Publication Nr. | Country Code | Kind Code | Publication Date | Inventor |
| WO 99/16049 | SG | A1 | 1999 Apr. 1 | WYSE |
| WO 2012/140468 | FR | A1 | 2012 Oct. 18 | Gillet |

Nonpatent Literature Documents

Alani, Ahmed and Deriche, Mohamed, "A Novel Approach to Speech Segmentation Using the Wavelet Transform," Fifth International Symposium on Signal Processing and its Applications, ISSPA '99, Brisbane.

Casey, Michael Anthony, "Auditory Group Theory with Applications to Statistical Basis Methods for Structured Audio," Ph.D. thesis at Massachusetts Institute of Technology, February, 1998.

Cont, Arshia et al., "Guidage: A Fast Audio Query Guided Assemblage," Proceedings of International Computer Music Conference (ICMC), Copenhagen, 2007.

Cope, David, "Experiments in Music Intelligence,"1987 ICMC Proceedings.

Davis, Steven B. and Mermelstein, Paul, "Comparison of Parametric Representations for Monosyllabic Word Recognition in Continuously Spoken Sentences," IEEE Transactions on Acoustics, Speech and Signal Processing, Vol ASSP-28, No. 4, August 1980.

Hoskinson, Reynald and Pai, Dinesh, "Manipulation and Resynthesis with Natural Grains," Proceedings of the International Computer Music Conference 2001.

Muda, Lindasalwa et al, "Voice Recognition Algorithms using Mel Frequency Cepstral Coefficient (MFCC) and Dynamic Time Warping (DTW) Techniques," Journal of Computing, Vol 2 #3, pp. 138-143. March 2010.

Jehan, Tristan, "Creating Music by Listening," PhD thesis at Massachusetts Institute of Technology, September 2005.

Sakurai, Yasushi et al., "FTW: Fast Similarity Search using the Time Warping Distance," Proceedings of the twenty-fourth ACM SIGMOD-SIGACT-SIGART symposium on Principles of database systems, pp 326-327, 2005.

Salvador, Stan and Chan, Philip, "Toward accurate dynamic time warping in linear time and space," Journal of Intelligent Data Analysis, Vol 11 #5, pp 561-580. October 2007.Schwarz, Diemo, "Distance Mapping for Corpus-Based Concatenative Synthesis," URM STMS Ircam, Sound and Music Computing (SMC), Padova, 2011.

Schwarz, Diemo, "Concatenative Sound Synthesis: The Early Years," Journal of New Music Research, Vol 35 #1, 2006.

Schwarz, Diemo et al, "Principles and Applications of Interactive Corpus-Based Concatenative Synthesis," Ircam—Centre Pompidou, 2008.

Schwarz, Diemo, "The CATERPILLAR System for Data-Driven Concatenative Sound Synthesis," Proc. Of the $6^{th}$ Intl. Conference on Digital Audio Effects (DAFx-03), London, UK Sep. 8-11, 2003.

Slaney, Malcolm, "Auditory Toolbox Version 2: Technical Report #1998-010", Interval Research Corporation.

PRIORITY CLAIM

This application claims priority from Provisional Patent Application No. 62/506,625, filed on May 16, 2017.

BACKGROUND OF THE INVENTION

Humans are sensitive to repetition in sounds, dialogue, and music. A single recorded footstep, repeated without variation, quickly becomes annoying to a listener. A single recorded piece of dialogue, repeated multiple times by a game, a toy, or a simulation, becomes distracting and destroys the illusion of live interactivity. The same piece of music, repeated many times over the course of the lifespan of a product or service, becomes tedious. Alarm systems and health monitoring devices can be ignored, because these auditory warnings are so repetitive. Virtual reality environments, digital simulations, and entertainments lose their realism when ostensibly natural sounds are repeated exactly.

A typical modern piece of interactive media can contain thousands of sound effects, dialogue, and music. These sounds are commonly recorded, edited, and mixed by audio engineers using highly specialized knowledge and tools. This process is both labor and effort intensive. Many modern pieces of digital media require multiple engineers and many hours to craft all the sounds needed to achieve a particular artistic or technical effect.

Music recordings, in particular, go through a mastering process, in which engineers select specific sound cues. These sound cues are then fixed in time, with mixing and other effects, to generate a fixed, linear score. By contrast, in a live artistic performance, musicians and singers make choices in the moment of performance. These choices imbue the sound with an improvisational, "of the moment" character that is often not adequately captured as a linear recording. Moreover, multiple takes or recordings of a particular song, performance, or experience may exist; however, the engineer selects which take a listener will ultimately hear. A listener is therefore deprived of a unique experience, as would have been the case had the user listened to the performance live.

Similarly, narrators and actors delivering lines as part of a performance will impart each bit of dialogue with a unique character, tone, and/or emphasis. As a result, no two recordings of spoken, live vocals will be precisely the same. And again, while multiple takes of a performer's voice can be, and often is, recorded, a sound engineer will select a single take to proceed with and ultimately to share with a listener. Moreover, once all takes have been listened to, there is no novelty to listen to previously recorded takes.

Furthermore, the process of merely making a specific sound span a particular length of time is cumbersome. For example, the process of changing a recording of laugher from two seconds in length to one second in length requires a sound editor to dissect and reassemble the individual elements of the sound using specialized programs and tools. While automated processes exist for changing the lengths of recordings arbitrarily, these processes often distort the sound unnaturally. For instance, the sound may be end up with a "chipmunk" effect if the sound is being compressed, or the sound may have a smearing, "stretching" effect introduced if the sound is being lengthened; this is particularly common with vocoders and related technology.

Engineers have made several prior attempts to address these problems; however, each of the previous approaches has significant limitations. One well-known approach is to individually record, edit, and modify all sounds manually. However, recording and editing novel sounds in this individual manner is a time and effort intensive process. Additionally, this approach generally requires the efforts of multiple audio engineers and recording artists, all of whom will need to use professionally-oriented software and tools.

Another well-known approach used by application developers involves creating, storing, and playing back multiple linear recordings, or takes, of a sound effect. However, this approach involves the use of additional production resources to record and implement the takes. At program execution time (that is, at playback time), a particular take is chosen and played for the user. Although this method somewhat reduces listener fatigue resulting from repetition, in time, the sounds still become repetitive as the listener's ear is fatigued from hearing only the predetermined sounds. As a result, it is not uncommon from consumers to simply disable all sounds from, for example, a video game, rather than enduring the repetitive sounds. Moreover, in practice, the multiple takes are stored in Random Access Memory (RAM). The RAM of consumer-grade computers is generally limited; as a result, maintaining these pre-recorded variations in a ready-to-play state consumes significant RAM in an interactive application and may cause the need for additional RAM to be purchased to store the sounds. For the developer of an interactive application, this additional resource consumption is undesirable, as is the time needed to manually record and implement each take.

One approach at random variation for pre-recorded sounds involves randomly varying the pitch or volume of linearly recorded sound effects. However, this sort of variation significantly reduces the quality of the final sound. Pitch-randomized sounds have a perceptible "chipmunk" quality, meaning that they tend to be higher in pitch. Similarly, volume-randomized sounds have a perceptibly different character than the original, static recording. As a result, the overall effect of randomization purely via pitch and volume variation is not convincingly natural. Additionally, the given takes are still quickly exhausted, causing ear fatigue.

Another approach for randomizing playback of sounds includes music stitching, and related algorithms. An expert designer or artist uses specialized software to divide input music or sounds into segments. The designer then describes to a software program how to stitch the segments back together using a predetermined or stochastic process. However, this process requires that the designer both understand and be able to express the high-level structure of the sound or music in question by using specialized tools and programming methods. Further, since each individual segment must be chosen, ordered, and have a probability assigned by a human designer, the music stitching approach requires hours or days to implement even a single variable sound. In the real world, many natural and musical sounds involve complex grammars made up of thousands or millions of elements. Thus, the corresponding syntax of a sound gets exponentially more complex as a sound gets longer or more complicated. As a result, it is at best extremely expensive, and at worst impossible, to accurately model sounds with stitching while also preserving a high quality and variety of randomized output.

Yet another approach for randomizing playback of sounds involves corpus-based concatenative synthesis (CBCS). CBCS systems often require many hundreds or thousands of sound variations to describe a sound. This requirement is impractical for sound designers, who generally maintain approximately a dozen (or fewer) takes of a particular sound as source material. Moreover, CBCS systems are not designed to accurately model sounds with non-trivial grammars, such as human speech and music. In fact, many common one-shot type sounds, such as impact sounds or footsteps, may not be accurately describable using CBCS. In addition, CBCS requires a significant amount of data storage to hold a database of possible sounds. This makes CBCS impractical for many modern computer systems, such as toys or cellular telephones.

Regardless of the approach used, existing random playback approaches require a trained sound designer or computer programmer to manually enumerate the list of possibilities using highly specialized software tools, such as scripting or a database. Such a process is tedious, error prone, and requires special training or experience. Additionally, this authoring process must be manually repeated for each new sound. This increases both the cost and complexity of creating and experiencing dynamic sounds.

Consequently, prior techniques for authoring and rendering non-repetitive sounds have remained in the hands of technical specialists. Representing and performing these variations requires significant computer resources and do not result in high enough quality to avoid ear fatigue. Additionally, authoring new, non-repetitive sounds is a time-consuming process that requires a trained expert to implement each sound differently. Accordingly, a need exists for high-quality, randomized, and dynamically generated sounds. Such synthesized output with random variations increases the range of expressiveness of simulations, games, toys, motion rides, theatrical presentations, movies, appliances, and many other media and digital devices.

SUMMARY OF THE INVENTION

The above deficiencies and other problems associated with repetitious digital audio are reduced or eliminated by the present disclosure in its various embodiments. The embodiments may be used, for example, to construct and render high-quality variations of sounds, without including a difficult and time-consuming authoring step. Sound engineering and design efforts to generate variations of audio outputs, previously requiring days or weeks of expert attention, can be done rapidly or automatically. Thus, the present disclosure can save significant time, money, and computing resources. Moreover, the present disclosure may make high-quality, novel, and ever-changing sonic experiences available to users of all experience levels and on a wide range of devices and applications.

The embodiments may be used, for example, to store audio variations with a data compression ratio that is orders of magnitude higher than previous techniques. Instead of storing a large set of similar audio files with classical psychoacoustic compression techniques, the model of the present disclosure includes information to permit a decoder to regenerate similar files using procedural techniques. As used herein, an audio file refers to a file containing a digital representation of sound; further, a decoder refers to the means by which a model is transformed into an output audio file. An output audio file refers to a file generated by the decoder from a model. As a result, using the model of the present disclosure may result in substantial savings in memory and other computer resources.

In one embodiment, a user provides one or more prototypes, or takes, of a particular sound as an input, or inputs. A prototype is analyzed, either entirely automatically or based on parameters provided by the user. As used herein, a parameter refers to a factor that describes the conditions under which a particular activity will occur. Based on the analysis, a model is generated, representing the likelihoods of various interpretations of the original sound. Each time a probability model is decoded, a novel-sounding output is generated. The repetition period for the probability model is sufficiently long that a listener is unlikely to perceive two outputs that are exactly repeated.

In another embodiment, a user may provide one or more sounds from a connected audio input device, such as a microphone. The input sound is analyzed and one or more output sounds, resembling some or all of the input sound, is generated. As a result, the sound outputs maintain the general sonic character of the input sound, but the output sounds do not sound precisely the same. Optionally, this sound synthesis can be varied based on user-provided, random, or pseudo-random parameters. This embodiment is simple to use, requiring no specialized training to generate the variations.

In yet another embodiment, a probability model is created ahead of use, based on one or more previously provided input audio files. As used herein, an input audio file refers to a file that contains information about a sound. Once created, the model is stored on a network device, such as a Web server or a file server. When ready to be used, the probability model may be downloaded onto a local device, such as a laptop or cell phone, so that the user can interactively generate novel-sounding outputs locally and in real time.

In yet another embodiment, a probability model is created ahead of use, based on one or more previously provided input audio files. The model is stored on a network device, such as a Web server or a file server. The server then generates one or more variable sound output files. The output files are then able to be transferred to a client device, such that they will be downloaded to the client device. The client device is also able to play one or more of the output files as part of a client application, such as a game, a movie, a virtual pet or doll, a notification, or any other type of application or device that plays sound to the user.

In another embodiment, a graphical user interface (GUI) permits a user to select one or more input audio files and then generate one or more output audio files. With the GUI, a user may add or delete sounds from the list of files to be processed as input. Then, the user may use the GUI to interactively audition, regenerate, and save individual sound output files. An additional GUI element can permit the user to generate multiple sound output files at one time. The GUI may further permit users to graphically edit and adjust probabilities associated with various subcomponents of the input sounds. No specialized training is required for the use of a GUI; rather, the user merely moves or "drags" the input sounds into the GUI. Further, the user has the option of setting parameters. The GUI then generates new sound files which the user can audition, save, export, and so forth. This embodiment generates new sounds more efficiently and easily, yet maintains a high level of quality.

In a further embodiment, the sound input files are stored in a database, for example, a computer database. The database may be a Structured Query Language (SQL)-type database, an index containing metadata, or any other database suitable for managing sound information. The database maps various search terms to sound files such that a user may search and locate a set of sound files by type or description. After a user queries the database, and the database returns a set of input audio files, the source sound files are processed by an encoder into a model. Then, the model is used to generate a sound output by the decoder. Thus, novel sound outputs corresponding to the user's original search terms may be synthesized. This embodiment may be used, for example, to extend the functionality of an existing library of pre-recorded sound effects, thus increasing the practical number of available sound options by an exponential amount.

In yet another embodiment, a user may provide one or more input audio files, which are then encoded into a model and decoded into example outputs. For each output, the user is able to provide an opinion regarding the quality of the generated output. The opinion may, for example, be rendered as a set of "like" and "dislike" buttons within a GUI. The opinion may also be rendered as a set of one or more values, which may be represented as sliders or "star ratings". The values represent the user's grading of the output quality, based on the user's individual artistic and technical requirements. Based on these user-provided opinions, a genetic algorithm may be applied; this algorithm modifies the behaviors of both the encoder and decoder such that the encoder and decoder produce outputs that are more to the user's liking. This allows a user with no special training or experience to both use the embodiment and to tune the behavior of the embodiment for specific technical and artistic requirements.

In another embodiment, a user may provide one or more input audio files, which are then encoded into a model and decoded into example outputs. To decode the example outputs, the decoder uses a pseudo-random number generator (PRNG), which provides a pseudo-random set of outputs when provided with a specific seed value. A different seed value may be selected for each iteration of the decoder. The user then provides an opinion regarding the quality of the generated outputs. The opinion may, for example, be rendered as a set of "like" and "dislike" buttons within a GUI, although examples are not so limited. If the user chooses to "like" a specific output, the seed value that was used to drive the PRNG is stored within the model. By contrast, if the user chooses to "dislike" a specific output, the seed value that was used to decode that specific output is discarded. As a result, the model is restricted to only creating outputs that have been pre-approved by the user. This permits many variations of a particular sound, or group of sounds, to be stored in the memory space of a single sound, thus providing substantial savings in computer memory and file system use.

In a further embodiment, the user may provide one or more input audio files, which are then encoded into a model and decoded into example outputs. During encoding or decoding of the model, the user may provide one or more parameters describing the desired length of the output recording. The desired length may be expressed as a range of desired time lengths or as an exact time length. Additionally, one or more parameters describing the nature of the content desired may be provided. These parameters may include "ambient", "one-shot", "spoken voice", or any other suitable parameter. During the decoding process, the decoder can rapidly generate multiple versions of outputs, and then select the output that best corresponds with the parameters provided by the user. Thus, the embodiment may be used to generate a variety of high-quality sounds that adhere to length and performance requirements of a user.

In another embodiment, the user may provide one or more input audio files, which may be encoded into a model and decoded into example outputs. In this embodiment, the user provides dissimilar audio content as the input. For example, a user might provide a character voice speaking multiple independent English sentences as inputs. The embodiment then looks for and finds areas of sound similarity between each of the input files and, based on these areas of sound similarity, creates a model. When decoded, the model creates a gibberish, "alien" language that retains the general sonic character of the inputs but is not the language of the inputs. Artistically, this embodiment can convey the emotional state of a character, whose dissimilar vocal stylings are provided as input, as a gibberish "artificial" language. Many interactive applications and devices use similar gibberish language to simulate the vocalizations of a character. However, under existing techniques, each gibberish phrase must be individually recorded, edited, and stored, which typically requires the efforts of a voice performer, a recording engineer, and an editing engineer, as well as the computer resources to store any variations or takes of the recordings. By contrast, this embodiment replaces the labor-intensive process with an automatic one, reducing the time and expense needed to produce this type of content. Moreover, this embodiment does not require as much memory or other computer resources as prior techniques. As a result, the embodiment may be implemented with less expense and into a wider variety of applications and devices. As one example, a virtual toy or character in a video game can be made to speak gibberish, where the gibberish varies each time it is spoken. As another example, a toy doll that simulates "baby talk" can be made to generate widely varying babbles and other baby-like speech, at capacity beyond the abilities of prior embodiments. As yet another example, a toy robot can be made to generate a highly variable series of noises, such as whirs, chirps, and beeps, conveying the emotional or other state of the toy robot. Thus, the embodiment can make many interactive applications and devices more entertaining and more realistic, while simultaneously reducing the cost to develop and manufacture such interactive applications and devices.

In yet another embodiment, a user provides one or more input audio files, which may then be encoded into a model and decoded into example outputs. The input audio files may represent a musical performance, as well as pre-recorded takes, or variations, of that performance. For example, the user may provide a background music track as well as several variations or takes of a singer's voice. The user may provide one or more parameters for the encoder. The embodiment then encodes the background music track, as well as the singer's variations, as a model containing information to decode one of a number of unique "performances" of the artist. A recording authored into this format may retain a "living" sonic quality since, as the performance of the singer varies naturally and slightly between playbacks, the listener enjoys a more engaging and immediate musical experience. Importantly, the pattern of the music is deduced from the auditory structure of the input audio files. This provides much more variety than an interactive music piece that was authored entirely manually, as is done using current technology. Additionally, the workflow of the embodiment may be easier to use for sound engineers than existing interactive audio authoring tools. Of course, this embodiment is not limited to varying only lead vocal tracks; other sonic performance elements, such as individual instruments, groups of vocalists, or other sound sources may be varied to provide new and interesting outputs. The only constraint is the existence of a sufficient number of representative takes of a particular performance.

DETAILED DESCRIPTION

An embodiment analyzes one or more audio input files and generates one or more output audio files that sound similar to the input files but are not precisely identical to any of the input files. The embodiment may synthesize, or decode, output from an encoded model in real time or in near-real time. The ability to decode output with minimal time delay provides quicker feedback to a user; in turn, this permits the user to increase his productivity.

Figure 1:
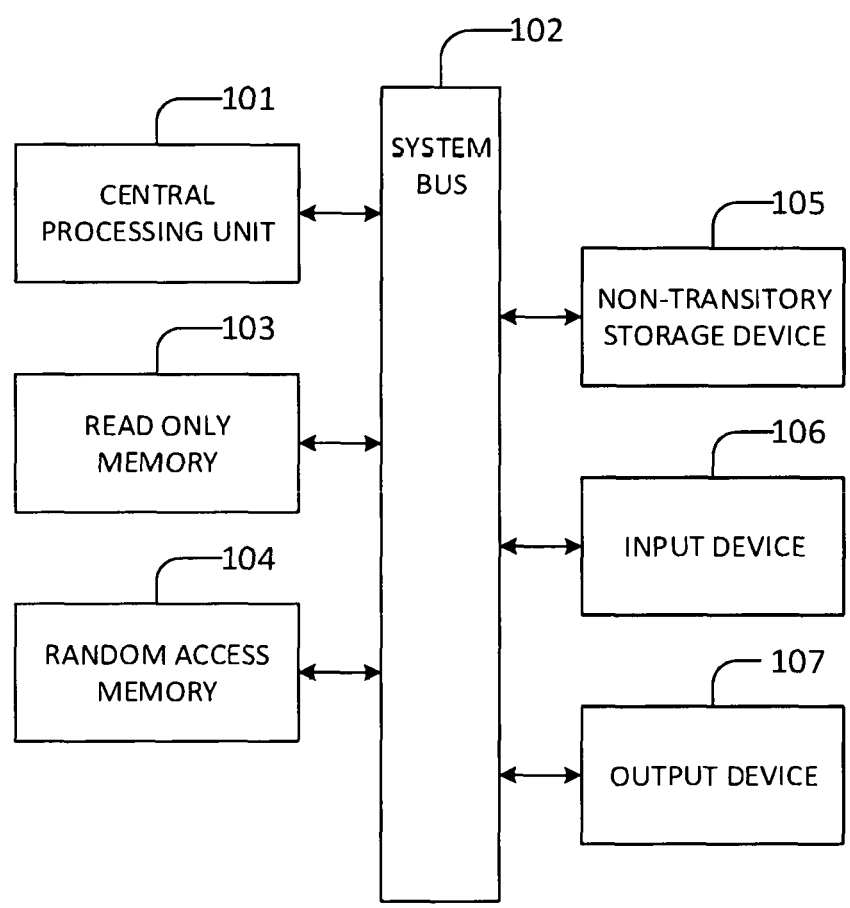
FIG. 1 is a diagram of an example system consistent with the present disclosure.

A computing device, such as is shown in FIG. 1, may include a processor 101. Processor 101 may be one or more central processing units (CPUs), microprocessors, and/or other hardware devices suitable for retrieving and executing instructions stored on a storage medium. As an alternative, processor 101 may include one or more electronic circuits containing a number of electronic components for performing functionality of the stored instructions.

A system bus 102 is coupled to the processor 101. As used herein, a system bus refers to a communication system that enables transfer of information between components of a computing device. For example, system bus 102 may enable data, address, and control information within the computing device. The system bus 102 may include read and write operations executable by the processor 101.

The computing device may further include read-only memory (ROM) 103 and random access memory (RAM) 104. ROM 103 may store information and program data such as a basic input/output system (BIOS), although examples are not so limited. The information stored on the ROM 103 may be available to the processor 101 via the system bus 102 during booting of the computing device. As used herein, booting refers to the initial startup sequence, including setup of system parameters, and bootstrapping of a computing device. By contrast, the RAM 104 may include information such as preprocessed model or program data, although examples are not so limited. The information stored in the RAM 104 may be available to the processor 101 via the system bus 102 after the system has completed the booting sequence, and may permit the processor 101 to read and write data that corresponds to the current state of the system.

Processor 101 may be coupled to a non-transitory computer readable medium 105. As used herein a non-transitory computer readable medium may be any electronic, magnetic, optical, or other physic storage device that stores executable instructions. Thus, non-transitory computer readable medium 105 may be, for example, RAM, an Electronically-Erasable Programmable Read-Only Memory (EEPROM), a storage drive, an optical disc, and the like. Non-transitory computer readable storage medium may be stored within a computing device, such as is shown in FIG. 1. Non-transitory computer readable medium 105 may further be a portable, external, or remote storage medium that allows processor 101 to download instructions from said storage medium.

An input device 106 may be coupled to system bus 102. As used herein, an input device refers to a device to receive an input. Input device 106 may be an analog-digital converter, a microphone input, an optical audio input, a mouse, a keyboard, or a touchpad. Examples are not so limited, however, and any input device may be used. Input device 106 may receive an audio input, such as a sound or a spoken sentence, and transfer the received input to the system bus 102. The received input may then be operated upon by the computing device of FIG. 1. The operations are discussed further herein. Although a single input device 106 is shown in FIG. 1, any number of input devices 106 may be used.

An output device 107 may be coupled to system bus 102. As used herein, an output device refers to a device to receive and display an output. Output device 107 may be, for instance, a speaker, a speaker array, a pair of headphones, an analog audio output, a digital audio output, or a video monitor. Although a single output device 107 is shown in FIG. 1, examples are not so limited, however, and any number of output devices 107 may be used.

Figure 2:
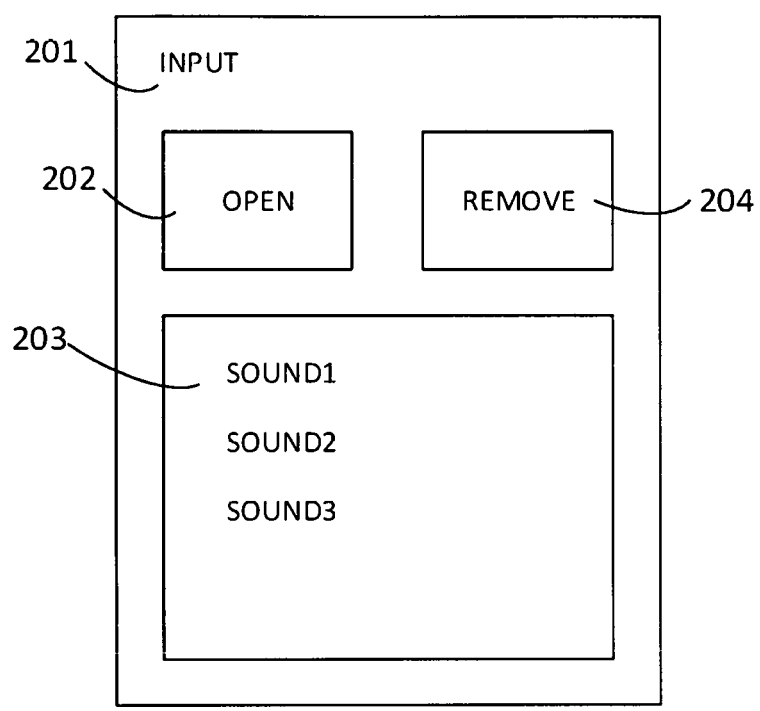
FIG. 2 is a diagram of an example Graphical User Interface (GUI) for accepting one or more sound input files as inputs consistent with the present disclosure.

FIG. 2 is a diagram of an example Graphical User Interface (GUI) for accepting one or more sound input files as inputs consistent with the present disclosure. A main encoder window 201 includes a plurality of controls for managing a list of input audio files. An Open button 202 may be activated by a user via, for example, a mouse, a tablet, a keyboard, or another input device. Once Open button 202 is activated, a dialog box may be displayed. The dialog box may permit the user to select one or more input audio files. In some examples, the selected input audio file may be an audio file received by input device 106, described with respect to FIG. 1. Selected audio files may be displayed as graphical elements, such as file names, in a table view 203. As used herein, a table view refers to a view in which elements are displayed in a series of rows and columns. Individual audio files may be added to the GUI of FIG. 2. A user may add multiple input audio files by activating Open button 202 and selecting an input audio file each time the corresponding dialog box is displayed. Alternately, a user may add input files to the GUI by dragging and dropping the input audio files to the table view 203, bypassing the use of Open button 202.

A Remove button 204 may also be provided. The Remove button 204 may permit a user to remove an added input audio file from the table view 203. A user may select an added input audio file and then activate the Remove button 204; the input audio file is then removed from the GUI. The Remove button 204 may permit a user to correct errors in adding input audio files by the Open button 202. Once a user has a completed list of input audio files displayed in table view 203, an encoder may be executed to analyze the input audio files and create a model; this process is discussed further herein with respect to FIG. 6.

Figure 3:
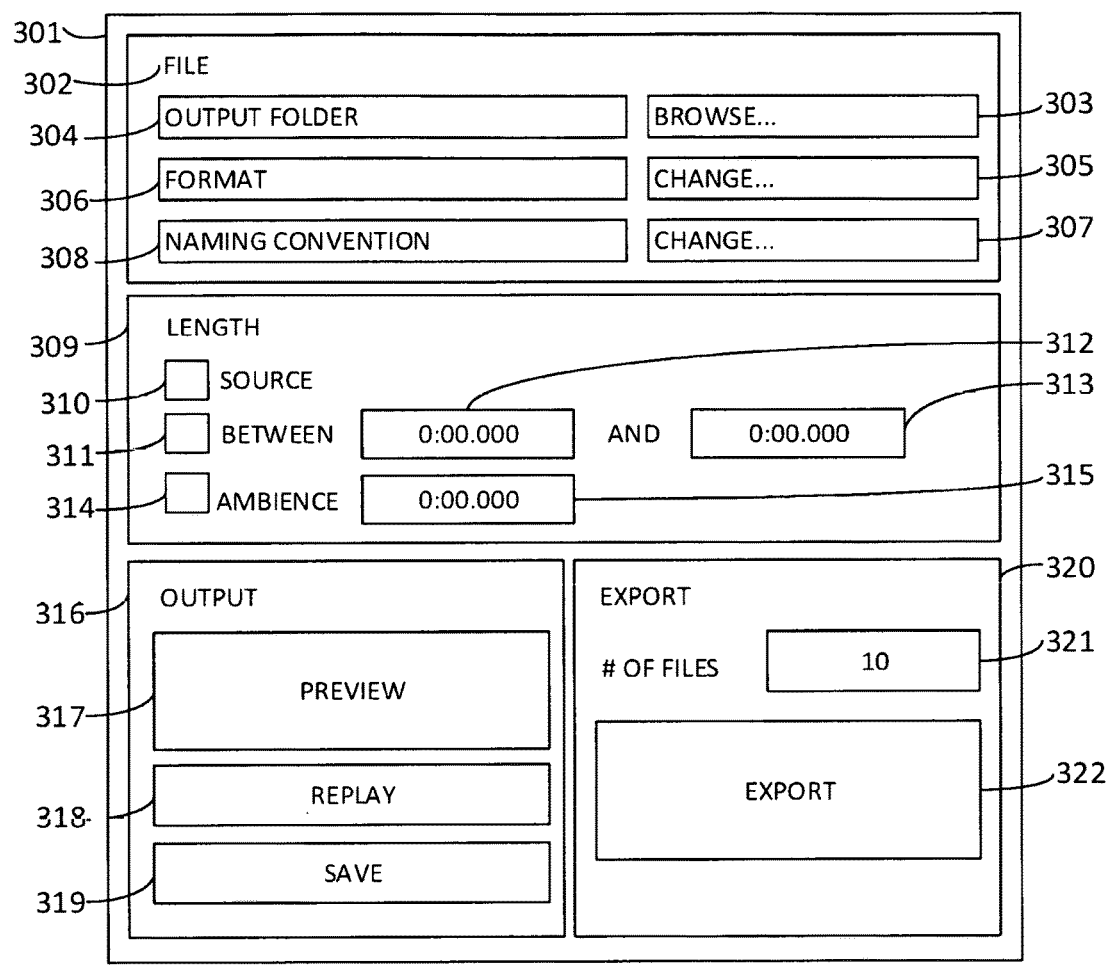
FIG. 3 is a diagram of an example GUI for generating one or more sound output files from a decoder consistent with the present disclosure.

FIG. 3 is a diagram of an example GUI for generating one or more sound output files from a decoder consistent with the present disclosure. A main decoder window 301 includes a plurality of controls and display elements to permit decoding of a model in conjunction with a variety of parameters and commands. The display elements may be divided into a plurality of panels, with each panel including a plurality of display elements corresponding to a particular type of parameter for an output audio file. A File panel 302 allows a user to describe the desired name, file format, and/or naming convention for an output audio model. For example, a user may desire output audio files to be saved as MP3 files and that each audio file of a set of audio files have the name "File" with a numerical designator following the name. A user would then input these descriptions into File panel 302.

A Browse button 303 may further be presented. Upon activation of Browse button 303, a dialog box may be presented. The dialog box may permit a user to select a folder into which output audio files will be placed, as well as the base name of the output audio files. The folder may be displayed within the GUI as output folder text box 304.

A user may opt to change the output file format via a File Format Change button 305. Upon activation of File Format Change button 305, a second GUI window is presented. This second GUI window is discussed further herein with respect to FIG. 4. Upon selection of an output file format, a description of the output file format is displayed in an output file format text box 306. A user may also activate a Naming Convention Change button 307. Upon activation of the Naming Convention Change button 307, a GUI window is presented to allow selection of a naming convention for an output audio file; this GUI window is discussed further herein with respect to FIG. 5. Upon selection of an output naming convention, a description of the output file naming convention is displayed in an output file format naming convention text box 308.

A Length panel 309 may allow a user to specify a desired length of time, or duration, for each output audio file. The Length panel 309 may include three checkboxes: a Source checkbox 310, a Between checkbox 311, and an Ambience checkbox 312. Selection of one of the checkboxes results in an automatic deselection of the other two checkboxes. For example, if the Between checkbox 311 is selected, the Source checkbox 310 and the Ambience checkbox 312 are deselected.

The Source checkbox 310 may be selected as a default. Selection of the Source checkbox 310 indicates that the encoder and the decoder automatically select the length of the output audio files based on the input audio files provided to the file. When the Between checkbox 311 is selected, a user is given the ability to select a length for the output audio files. To do so, the user inputs a range of acceptable lengths; a low end of the range is entered into a low limit text box 312 and a high end of the range is entered into a high limit text box 313. The limits may be entered as a combination of minutes: seconds: milliseconds or by using Society of Motion Picture and Television Engineers (SMPTE) time code format.

Selection of the Ambience checkbox 312 may occur when the input audio files correspond to ambience-type sound effects, such as waves, wind, streams, and crowd noise. Upon selection of the Ambience checkbox 312, a user inputs a desired amount of time into an Ambience time entry box 315. The encoder and decoder then generate an output audio file of an ambient-type noise having the desired length. Selection of the Ambience checkbox 312 causes a change in the calculation of the time offset ratio, discussed further herein with respect to FIG. 8, to de-emphasize temporal ordering.

An output panel 316 may permit a user to audition and, optionally, save audio output files that are generated by the decoder from the model. Output panel 316 may include a Preview button 317. When the Preview button 317 is selected, an output audio file is retrieved. The output audio file may be generated by the decoder from the model, in response to the selection of Preview button 317, or the output audio file may be taken from a list of previously generated files. The output audio file is then reproduced on output device 107, discussed with respect to FIG. 1, thus allowing the user to preview or audition the output audio file.

If the output audio file is not acceptable to the user, the user may select the Preview button 317 again. Doing so repeats the process of retrieving an output audio file and reproducing it on an output device 107. The user may repeat the process of previewing output audio files until a satisfactory output audio file is found. If the user is unsure whether the output audio file is acceptable, the user may select a Replay button 318. By selecting the Replay button 318, the user is able to re-listen to the most recent output audio file. If the output audio file is acceptable to the user, the user may select a Save button 319. Selection of the Save button 319 saves the most recently previewed output audio file to the output folder, displayed in output folder text box 304, in the output file format displayed in output file format text box 306, and using the file naming convention displayed in the file naming convention text box 308.

An export panel 320 may be used to decode multiple output audio files from a model at one time. A user may enter a desired number of output audio files into the number of files text box 321. The user then selects the export button 322. Upon selection of the export button 322, a decoder generates the requested number of output audio files. The generated output files are transferred to the output folder displayed in output folder text box 304, in the particular file format specified in output file format text box 306, and using the naming convention 308. In this manner, large numbers of varying audio content can be generated rapidly.

Figure 4:
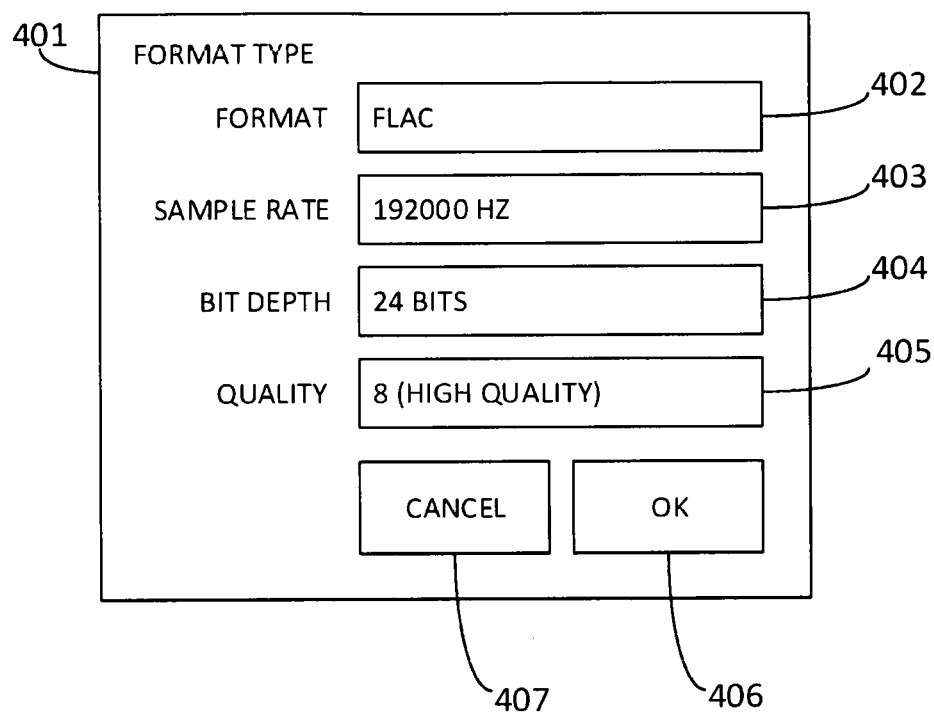
FIG. 4 is a diagram of an example GUI for specifying a desired output audio file format consistent with the present disclosure.

FIG. 4 is a diagram of an example GUI for specifying a desired output audio file format consistent with the present disclosure. A format type window 401 is displayed to a user upon selection of the File Format Change button 305, described with respect to FIG. 3. Upon display of the GUI shown in FIG. 4, a user may select a file format from the file format list box 402. The file format list box 402 contains a list of audio file formats, such as WAV, MP3, Ogg Vorbis, FLAC, AIFF, and other similar formats. The user may further select a sample rate from the sample rate list box 403. As used herein, a sample rate refers to the rate at which sound is captured and played back. The sample rates included in the sample rate list box 403 may range from 8000 Hertz (Hz) to 384,000 Hz, although other ranges may be used. In addition, the sample rates in the sample rate list box 403 may not include the full possible range of sample rates able to be used by the decoder, but rather may represent a predetermined range for user ease.

The user may further select a bit depth from the bit depth list box 404. As used herein, a bit depth refers to a sample size, or the number of bits used to describe a sample. The bit depth list box 404 contains a list of bit depths, such as 8 bit, 16 bit, 24 bit, 32 bit, float, double, and similar types. The bit depths available within the bit depth list box 404 may be limited by the file format selected at the file format list box 402. For example, if Ogg Vorbis is selected in the file format list box 402, the bit depth is going to be fixed within the bit depth list box 404, as that particular type of audio file format has a particular bit depth associated with it.

A user may further select a quality from the quality list box 405. Selection of the quality may be done using a numerical scale, e.g., one through ten, where higher numbers represent a higher quality. For example, for particular types of file formats, such as MP3 and FLAC, selection of a particular quality may bias the generation of the output audio files to a higher compression ratio or toward a higher overall quality. Once the user has made their selections using the GUI, the user may accept the choices by pressing the OK button 406. Alternately, the user may cancel their choices and make no changes by pressing the Cancel button 407.

Figure 5:
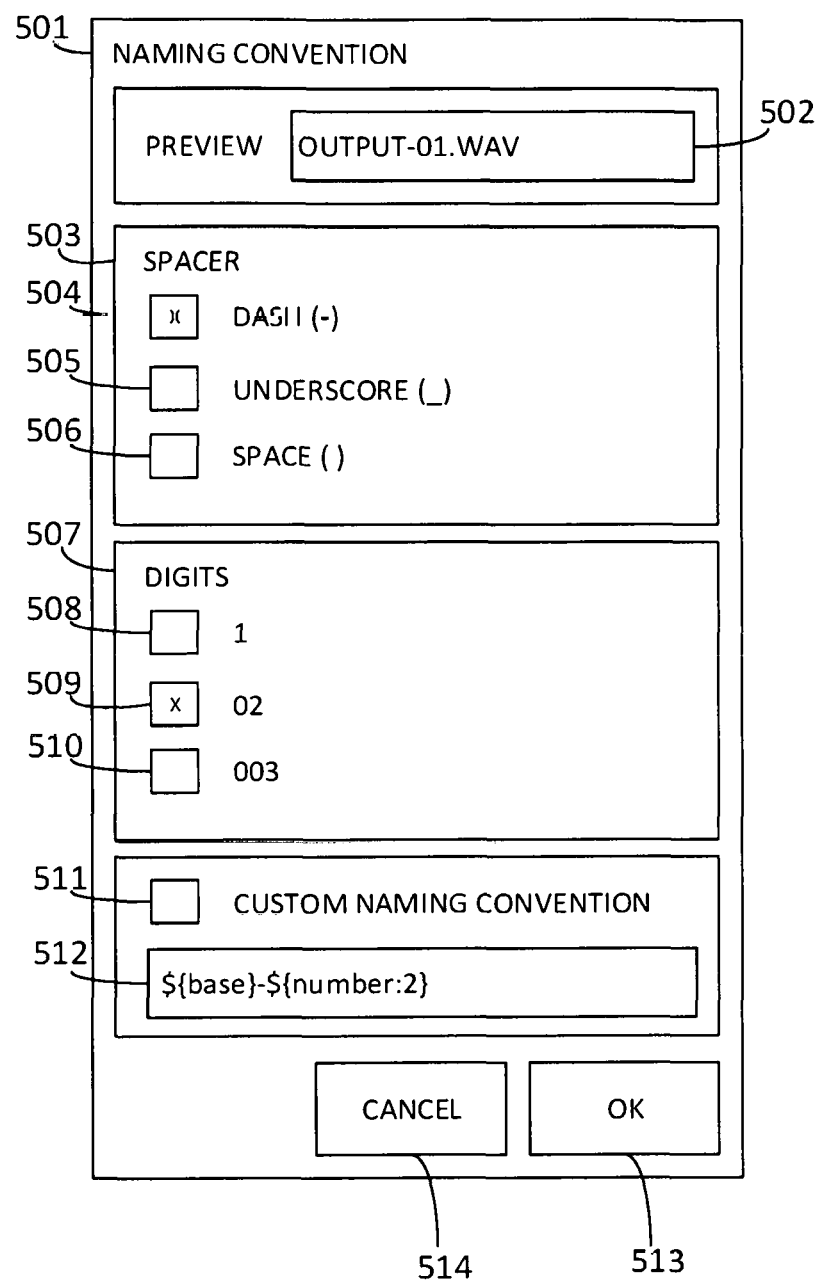
FIG. 5 is a diagram of an example GUI for specifying a desired output audio file naming convention consistent with the present disclosure.

FIG. 5 is a diagram of an example GUI for specifying a desired output audio file naming convention consistent with the present disclosure. A naming convention window 501 is displayed to a user when the user activates the Naming Convention Change button 307, described previously with respect to FIG. 3. Upon activation of the GUI, an example file name is displayed in the preview text box 502. The contents of the preview text box 502 are not editable by the user; rather, the information that appears in the preview text box 502 is generated as a result of other parameters chosen by the user. In a Spacer panel 503, a user may select a character to separate a base output file name from a number. The user may select a dash by selecting dash checkbox 504, an underscore by selecting underscore checkbox 505, or a space by selecting the space checkbox 506. Selection of one of the checkboxes 504, 505, 506 automatically deactivates the other two checkboxes. For example, if a user selects the dash checkbox 504, both the underscore checkbox 505 and the space checkbox 506 will be deactivated. Additionally, selection of a spacer causes the contents of the preview text box 502 to be updated.

A digits panel 507 may be included within the GUI. Within the digits panel 507, a user is able to select a number of leading zeroes to be appended to the base name of the example output file name. A user may select no leading zeros by selecting the One checkbox 508 (labeled "1"), one leading zero by selecting the Two checkbox 509 (labeled "02") or two leading zeroes by selecting the Three checkbox 510 (labeled "003"). As with selection of a spacer, selection of a number of leading zeroes will update the contents of the preview text box 502.

When the decoder saves or exports one or more audio files, a check is performed to determine whether a file of that name has previously been saved, and still exists, at the location where the current output audio file is to be exported. If a file of the same name exists, the number suffix at the end of the file name, including the leading zeroes selected by the user at the digits panel 507, is implemented, with the numbers increasing incrementally until a unique file name is generated.

Alternately, a custom naming convention checkbox 511 may be selected. Selection of the custom naming convention checkbox 511 permits the user to specify a particular, custom convention for naming output audio files within a custom naming convention text box 512. The custom naming convention is comprised of a number of strings. The string "${base}" represents the base file output name, while the string "${number:X}" represents a location in the example file where an automatically incremented number should go. The X in the "${number:X}" string represents the number of significant digits desired. A user may add additional spacers and/or alter the order of the strings as desired. The user may accept any changes using the OK button 513, or the user may reject any changes with the Cancel button 514.

Figure 6:
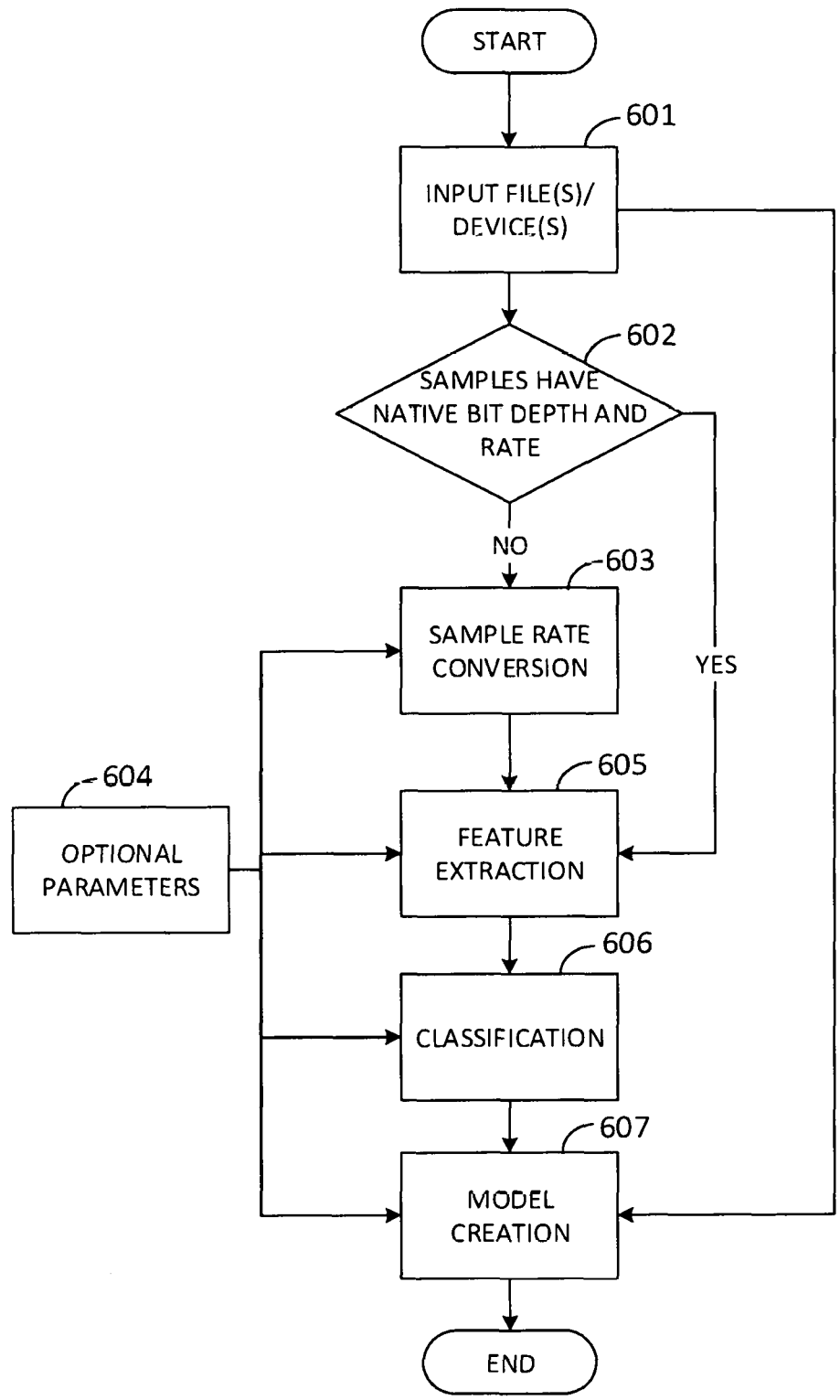
FIG. 6 is a diagram of an encoding process consistent with the present disclosure.

FIG. 6 is a diagram of an encoding process consistent with the present disclosure. At 601, a set of input audio files are accepted by the encoder. The input audio files may be provided as a set of command-line parameters or, if the encoder is intended to accept input data from an input device 106 (discussed with respect to FIG. 1), as an input audio file.

At 602, the input audio files received at 601 are compared to a native bit depth and a native sample rate. As used herein, a native bit depth refers to an arbitrarily chosen bit depth, and a native sample rate refers to an arbitrarily chosen sample rate, selected prior to beginning the encoding process. If an input audio file is determined to have a sample rate not equal to the native sample rate or a bit depth not equal to the native bit depth, ("No"), the input audio file moves to step 603, where it is resampled using sample rate conversion. Upon completion of sample rate conversion at step 603, the resampled input audio file moves to step 605, where feature extraction is performed. If, however, the input audio file is determined to match the native sample rate and the native bit depth at 602 ("Yes"), the input audio files move to step 605.

Optional parameters 604 may be used at multiple points during the encoding process. Sample rate conversion 603, feature extraction 605, classification 606, and model creation 607 are, at the user's or application designer's option, able to have optional parameters provided at 604. If parameters are not provided at 604, default values are used. Optional parameters may be provided at 604 to, for example, tune across a test suite of input audio files to ascertain the quality of the encoder and the decoder. Alternately, or additionally, optional parameters may be provided at 604 to tune the values to acceptable values such that the values are consistent across multiple executions of the encoding process.

At 605, feature extraction is performed. As used herein, a feature refers to a statistical representation of one or more elements of a sound; further, as used herein, feature extraction refers to the process of determining a likelihood that person will perceive certain ranges of an input audio file as similar. During feature extraction, the encoder determines a series of statistical measures, or features, of a plurality of ranges for each audio input file provided at step 601. Features may include root mean square (RMS), time offset ratio, mel frequency cepstral coefficient, spectral rolloff, spectral incidence, and spectral centroid, although examples are not so limited. Each extracted feature is weighed by one or more parameters. That is, each feature may be multiplied by, increased by, or decreased by, a value corresponding to a particular parameter. The parameters, which may correspond to the optional parameters 604, may be provided by a user or by a developer. The relationship of the parameters to the extracted features is discussed further herein with respect to FIGS. 7-10.

Upon completion of feature extraction at 605, the encoder process moves to classification at step 606. At 606, the encoder sorts the features extracted at 605 into classes based on their similarity. As used herein, a class refers to a set of strands or features that share some sonic characteristic. In other words, classification at 606 determines how many classes of packets exist in the input audio files, and which packet ranges belong to each class. As used herein, a packet refers to collection of short-term audio data. Classification at 606 may involve the creation of a clustering analysis model, such as a Gaussian mixture model or an expectation maximization model. Classification at 606 may further include filtering degenerate strands and classifications, as well as scoring the classifications and selecting the best classification for the model. Classification is discussed further herein with respect to FIGS. 11-12.

At step 607, model creation occurs. As used herein, a model refers to a file containing a representation of audio as a set of probabilities over time. These probabilities describe which strands belong to which classes and the likelihood that certain classes precede or succeed other classes. During model creation, the classification chosen at 606, as well as the input audio files from 601, are received as inputs. The encoder then generates strands of one or more packets analyzed during classification. As used herein, a strand refers to a unit of sound comprising one or more packets. The generated strands are then collated. Model creation step 607 then analyzes the likelihoods of sequences of strands by representing the individual strands as an alphabet. As used herein, an alphabet refers to the set of all valid symbols representing all the classes in a model, including several special symbols. The alphabet is then used to train a dictionary of probabilities. As used herein, a dictionary refers to a system of predicting the next symbol of an alphabet, given a sequence of zero or more previous symbols in that alphabet. The trained dictionary, as well as the strands that contain non-redundant audio data, are stored as a model. This model represents the input audio files as a set of likelihoods of sound over time.

Figure 7:
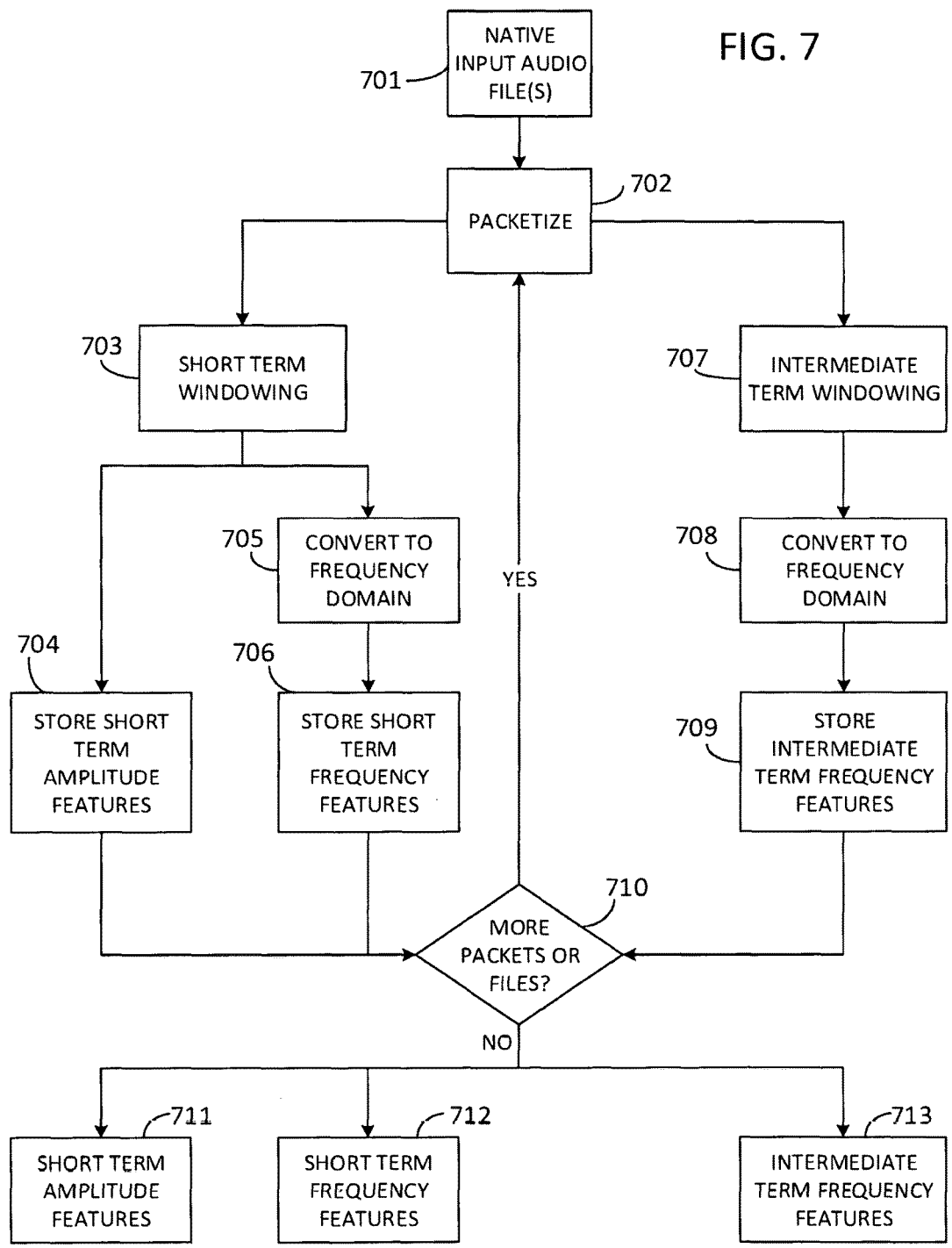
FIG. 7 is a diagram of the encoding step of feature extraction consistent with the present disclosure.

FIG. 7 is a diagram of the encoding step of feature extraction consistent with the present disclosure. At 701, native input audio files are received. As used herein, a native input audio file refers to an input audio file upon which sample rate has been computed to fix the bit depth and sample rate of the input audio file to a known default. The native input audio files received at 701 may have been processed through sample rate conversion at step 603 of FIG. 6. The native input audio files are then packetized at step 702. As used herein, packetizing refers to the process of breaking an audio file into discrete packets. For example, if a native input audio file received at 701 contains multiple channels, simultaneous sound data is encapsulated into one packet at 702.

Similarly, if a native input audio file received at 701 contains temporal positional data, for example ambisonic data, this information is stored in each packet.

At 703, short term windowing is performed on the packetized audio files. A short term window function is applied successively to ranges of one or more packets. The length of the short term window may range from 1 millisecond to 60 milliseconds, although other lengths may be used. Additionally, each window function is oversampled by a factor of two, resulting in overlap between successive windows. By oversampling each window function, new lists of oversampled short term features within the amplitude domain are produced, where each list corresponds to a particular native input audio file. Upon completion of the short term windowing at 703, the short term amplitude features produced are stored at 704.

At 705, the list of oversampled packets in the amplitude domain is converted to a frequency domain. The oversampled packets may be converted using a function within the discrete Fourier transfer family, such as a fast Fourier transform, although examples are not so limited. Transforming the oversampled packets at 705 result in new lists of oversampled short term features in the frequency domain, with each list corresponding to a particular native input audio file. These short term frequency features are stored at 706. In some examples, steps 705 and 706 may be performed in parallel with storing short term amplitude features at 704. In other example, steps 705 and 706 may be performed serially with storing short term amplitude features at 704.

At 707, intermediate term windowing occurs. Intermediate term windowing at 707 may occur serially or in parallel with short term windowing at 703. An intermediate term windowing function is applied successively to ranges of one or more packets. The length of an intermediate term window may range from 60 milliseconds to 1000 milliseconds, although other lengths may be used. Each window function is oversampled by a factor of at least two, although a greater factor of oversampling may be used. By oversampling the window functions, successive windows will have some overlap, with the amount of overlap depending on the factor by which the function is oversampled. As a result, new vectors of oversampled intermediate term packets in the amplitude domain are produced, with each vector corresponding to a particular native audio input file.

At 708, the oversampled intermediate term packets in the amplitude domain produced at 707 are converted to a frequency domain. The conversion to a frequency domain at 708 may occur by a function of the discrete Fourier transform family, such as a fast Fourier transform, although examples are not so limited. The resulting intermediate term frequency features, shown at 713, are then stored at 709, where they may be accessed for subsequent processing.

Once the short term features are stored, either at 704, 706, or 709, a determination is made at 710 as to whether more packets or files from the native input audio files received at 701 have been processed. If there are additional packets or files ("yes"), the process of packetization at 702, as well as all subsequent processes, are repeated on the unprocessed packets or files. If, however, there are not additional packets or files ("no"), the stored features are separated based on their type. For example, short term amplitude features may be separated at 711, short term frequency features may be separated at 712, and intermediate term frequency features may be separated at 713. Separation may permit additional processing based on the particular type of feature; this additional processing is discussed further herein with respect to FIGS. 8-10.

Figure 8:
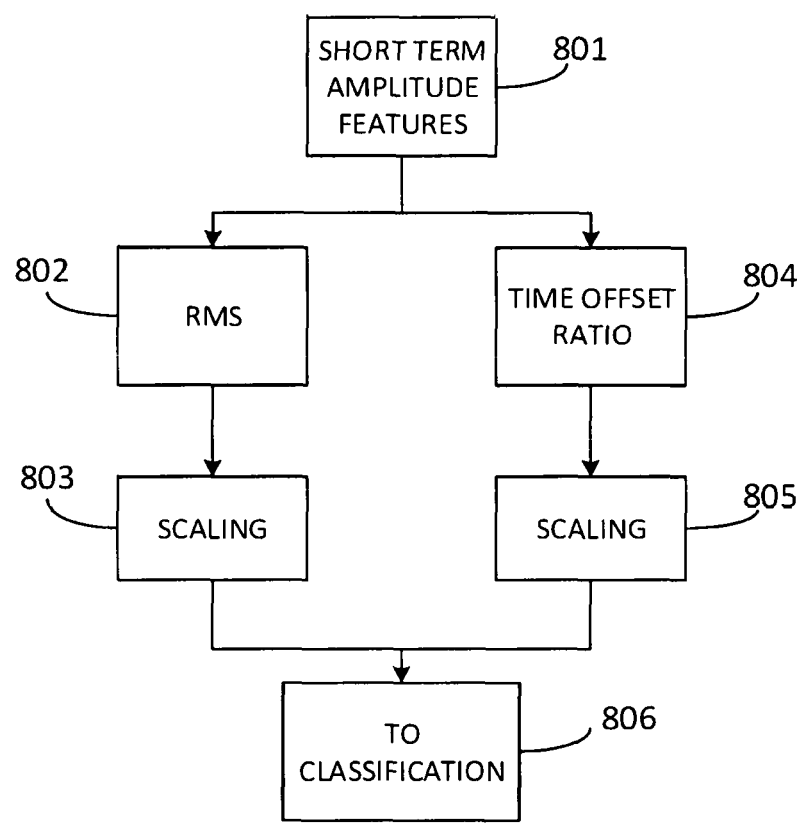
FIG. 8 is a diagram of the step of transforming short-term amplitude features into inputs consistent with the present disclosure.

FIG. 8 is a diagram of the step of transforming short-term amplitude features 801, such as those shown at 711 (discussed with respect to FIG. 7), into inputs consistent with the present disclosure. At 802, a root mean square (RMS) is computed for each short term amplitude feature of 801. Each RMS is then scaled by a parameter at 803. At 804, a time offset ratio is determined for each short term amplitude feature of 801. As used herein, a time offset ratio refers to the ratio of the time offset of a particular feature from the beginning of the input file to the total time of that input audio file. For example, a short term amplitude feature may occur one second into an input audio file. The total length of the input audio file may be two seconds. Thus, the time offset ratio is one half. Determination of the time offset ratio at 804 may be determined serially or in parallel with the computation of the RMS at 802 and scaling of the RMS at 803. At 805, the time offset ratio determined at 804 is scaled by a parameter. At 806, the scaled RMS determined at 803 and the scaled time offset ratio determined at 805 are collected. The collected values may be passed to classification, discussed further herein with respect to FIG. 11.

Figure 9:
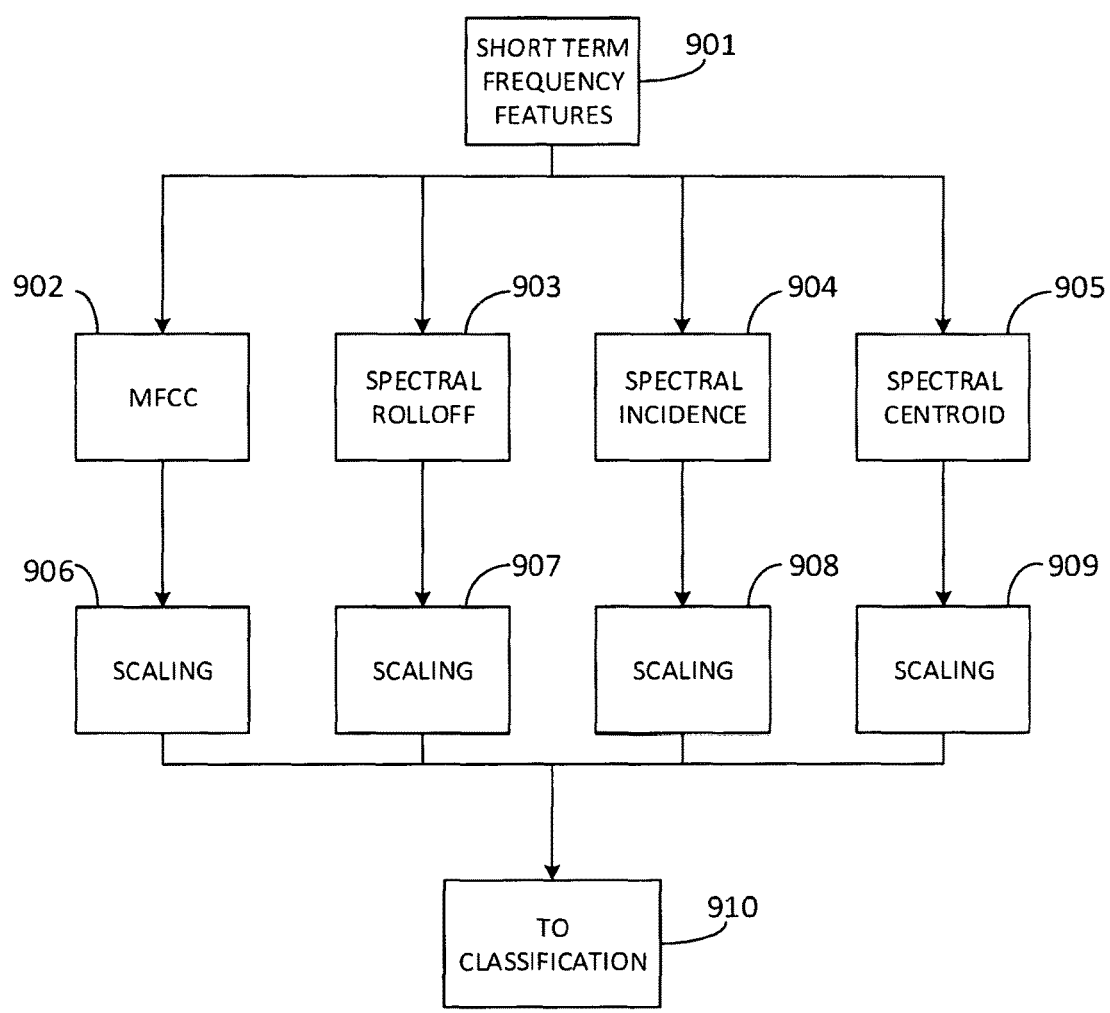
FIG. 9 is a diagram of the step of transforming short-term frequency features into inputs consistent with the present disclosure.

FIG. 9 is a diagram of the step of transforming short-term frequency features, such as those shown at 712 (described with respect to FIG. 7), into inputs consistent with the present disclosure. The short term frequency features may be received at 901. At 902, the mel frequency cepstral coefficient (MFCC) for each short term frequency feature is determined. As used herein, an MFCC refers to the power spectrum of a sound, based on a cosine transform of a log power spectrum on a mel frequency scale. Parameters for the MFCC, such as the number of bins, may be set by a user or by an application designer. Upon determination of the MFCC value at 902, the value may be scaled at 906. Scaling may be done according to parameters set by the user or by an application designer.

At 903, a spectral rolloff value for each short term frequency feature may be determined. As used herein, spectral rolloff refers to the frequency under which, some percentage cutoff of the total energy of the spectrum, is contained. Parameters used for the determination of the spectral rolloff, such as the kappa value, may be provided prior to determination of the spectrum rolloff value, either by a user or by an application designer. Upon determination of the spectral rolloff value at 903, the value may be scaled at 907. Scaling may be performed according to parameters set by the user or by an application designer.

At 904, a spectral incidence value for each short term frequency feature may be determined. As used herein, spectral incidence refers to the first frequency that contains sufficient energy to exceed a threshold value. Parameters used for the determination of a spectral incidence value, such as the desired threshold value, may be set by a user or by an application designer. Upon determination of the spectral incidence value at 904, the spectral incidence value may be scaled at 908. Scaling may be performed according to parameters set by the user or by an application designer.

At 905, a spectral centroid value for each short term frequency feature may be determined. As used herein, spectral centroid refers to the weighted mean of the frequencies present in the signal, with the frequency magnitudes as weights. Parameters used for the determination of the spectral centroid, such as the number of bins, may be provided prior to determination of the spectrum centroid value, either by a user or by an application designer. Upon determination of the spectral centroid value at 905, the value may be scaled at 909. Scaling may be performed according to parameters set by the user or by an application designer.

MFCC determination at 902, spectral rolloff value determination at 903, spectral incidence value determination at 904, and spectral centroid value determination at 905 may be performed in parallel or serially. Upon completion of each determination, and the scaling of each determination, the final scaled values may be collected at 910. The collected values may then further be classified, as will be discussed herein with respect to FIG. 11.

Figure 10:
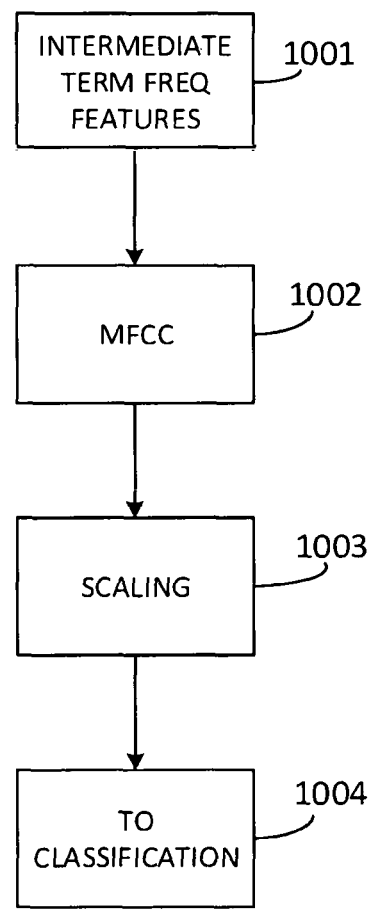
FIG. 10 is a diagram of the step of transforming intermediate-term frequency features into inputs consistent with the present disclosure.

FIG. 10 is a diagram of the step of transforming intermediate-term frequency features 1001, such as intermediate term frequency features 713 (discussed with respect to FIG. 7), into inputs consistent with the present disclosure. At 1002, the intermediate term features 1001 may be processed by determining an MFCC value for each feature. At 1003, the MFCC value may be scaled; the scaling may utilize a parameter or multiple parameters provided by a user or by an application developer. At 1004, the scaled value may be collected and passed to a classifier, described herein with respect to FIG. 11.

Figure 11:
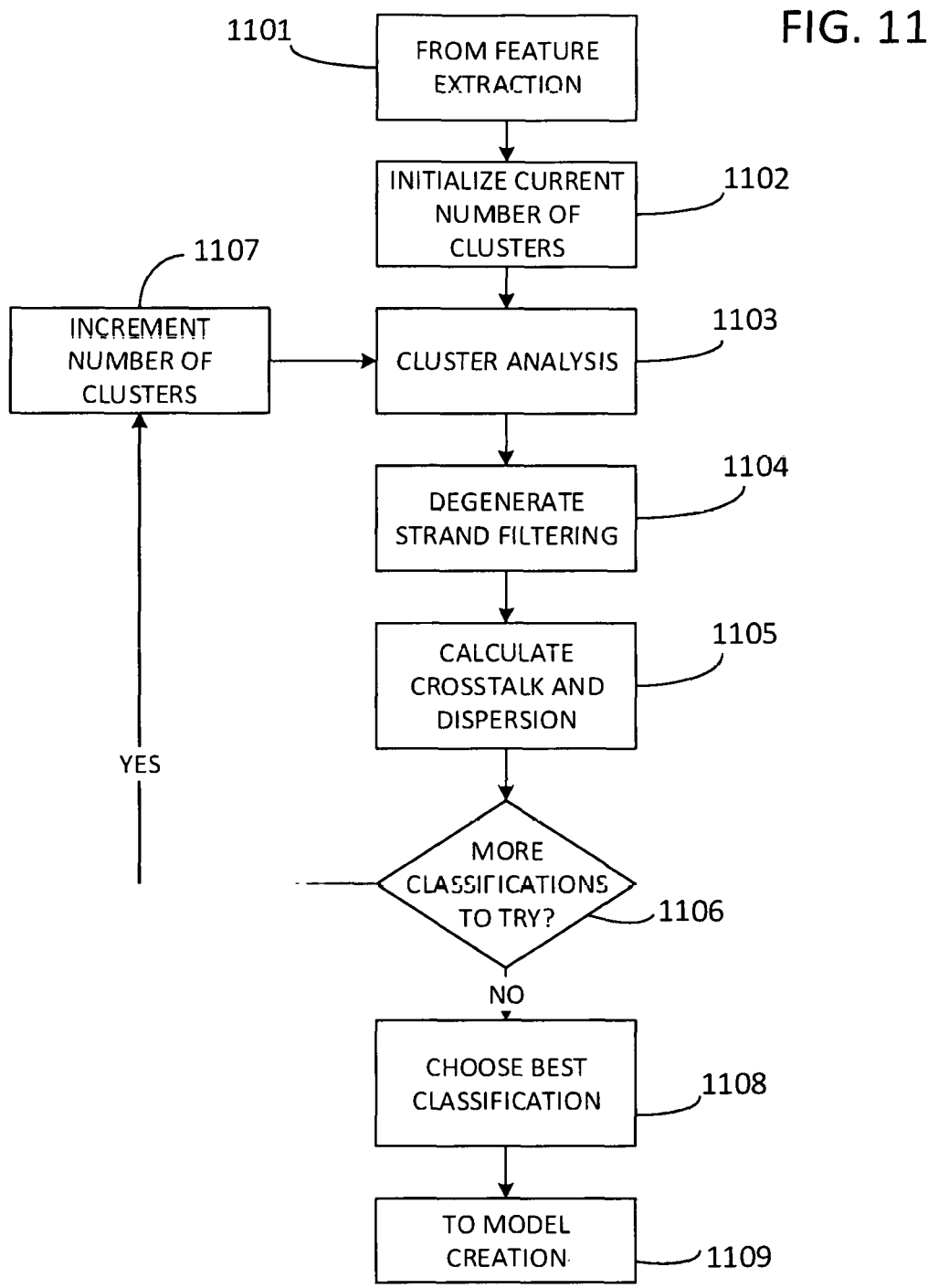
FIG. 11 is a diagram of using inputs for a classification step to compute classifications consistent with the present disclosure.

FIG. 11 is a diagram of using inputs for a classification step to compute classifications consistent with the present disclosure. At 1101, inputs are received. The inputs may be received from the feature extraction, such as the feature extraction performed at 605 of FIG. 6. The inputs may be, for example, short term amplitude features (discussed with respect to FIGS. 7-8), short term frequency features (discussed with respect to FIGS. 7 and 9), and intermediate term frequency features (discussed with respect to FIGS. 7 and 10). At 1102, an initialization of the current number of clusters is performed. Initialization at 1102 may include setting a parameter corresponding to a minimum number of acceptable clusters.

At 1103, cluster analysis is performed on the feature extraction inputs provided at 1101. As used herein, cluster analysis refers to the process of grouping features such that similar features are grouped together; a group of similar features is called a cluster. Cluster analysis at 1103 may be performed by, for example, a k-means algorithm with expectation maximization (iterated as necessary). Cluster analysis at 1103 may also be performed using a neural network, a multilayered perceptron, principal component analysis, or a machine learning algorithm. Examples are not so limited, however, and any means of cluster analysis may be used.

At 1104, the clustered input features undergo degenerate strand filtering. During degenerate strand filtering, an encoder iterates through each audio file. Each contiguous sequence of features from a single input audio file that have been categorized at 1103 into a single cluster is referred to as a strand. Said differently, a strand refers to a single discretely recognizable sound, which may be comprised of one or more packets from an original input audio file. The encoder applies a short term low pass filter to remove strands whose length is less than a tolerance value, specified by a parameter. For example, a parameter may be set such that the tolerance value for a strand is 45 milliseconds. During degenerate strand filtering at 1104, any strand having a length of less than 45 milliseconds would be removed. Examples are not so limited, however, and any tolerance value may be used.

At 1105, values of crosstalk and dispersion are calculated for the filtered features. As used herein, crosstalk refers to the average ratio of the number of input audio files containing a particular cluster to the total number of input audio files. Said differently, crosstalk refers to a likelihood that each cluster represents a feature that is sourced from each input audio filed. For example, a clustering, and the corresponding strand assignment, which has each cluster present in the features from each input audio file would have a crosstalk value of one; by contrast, if the cluster is only present in the features of one audio file, the crosstalk value would be zero.

As used herein, dispersion refers to a maximum value of all standard deviations of the lengths of each strand per cluster. Said differently, dispersion refers to the similarity in length between all strands assigned to a particular cluster. In cases where the strands assigned to a particular cluster are similar in length, the dispersion value may be low. This may occur, for instance, when the strands within a cluster represent a particular syllable of speech, although examples are not so limited. By contrast, when the strands assigned to a particular cluster vary in length, dispersion value may be higher, as the maximum standard deviation value between all strands of that cluster will be greater.

At 1106, a determination as to whether additional classifications to try to generate is made. This determination is made by determining whether any of the clusters created in the most recently completed classification contained no audio data, making it a null set. If no null set exists, a "yes" determination is made; the process then goes to 1107, where an incremented number of clusters is determined and cluster analysis at 1103 begins. If, however, a null set exists, or if the number of classifications created exceeds a limiting parameter, a "no" determination is made.

Figure 12:
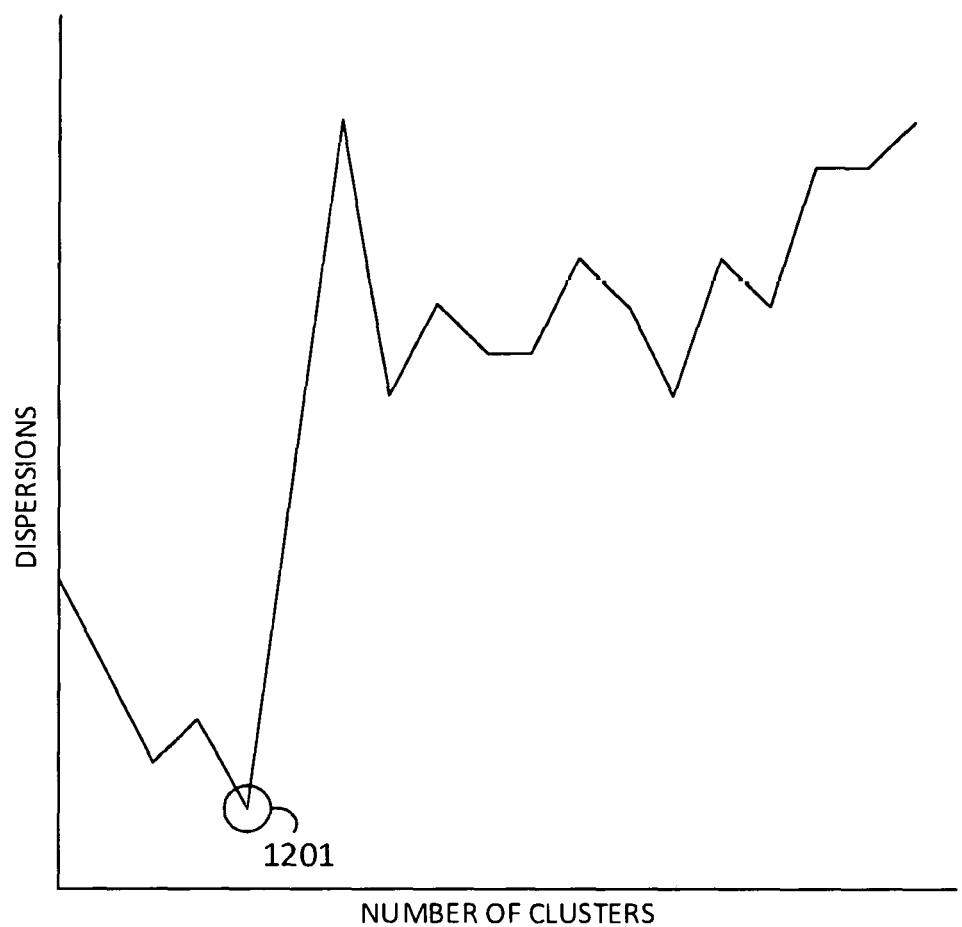
FIG. 12 is a diagram indicating the selection of a particular classification by the encoder consistent with the present disclosure.

At 1108, the best classification of the previously made classifications is determined. To choose the best classification, the encoder calculates a second derivative for all previously stored dispersion scores, in order of the number of clusters to which each dispersion score corresponds. In some examples, dispersion scores at the extreme ends (e.g., unusually high or unusually low dispersion scores) may be discarded. The second derivative values are then scaled such that they are normalized to have a value between zero and one. Higher values of the scaled derivatives may occur when dispersion increases; that is, higher values of the scaled derivatives occur for classifications in which strands of a cluster tend to be the same or similar length. See FIG. 12 for a graphical representation of this. In FIG. 12, it will be noted that a local minimum value 1201 is located. The scaled second derivative value, as well as the crosstalk value, for each classification is weighted and combined to produce a final quality score for each classification. The best classification is selected as the classification with the highest final quality score; the remaining classifications and cluster analyses are discarded. At 1109, the best classification is transferred to begin the process of model creation.

Figure 13:
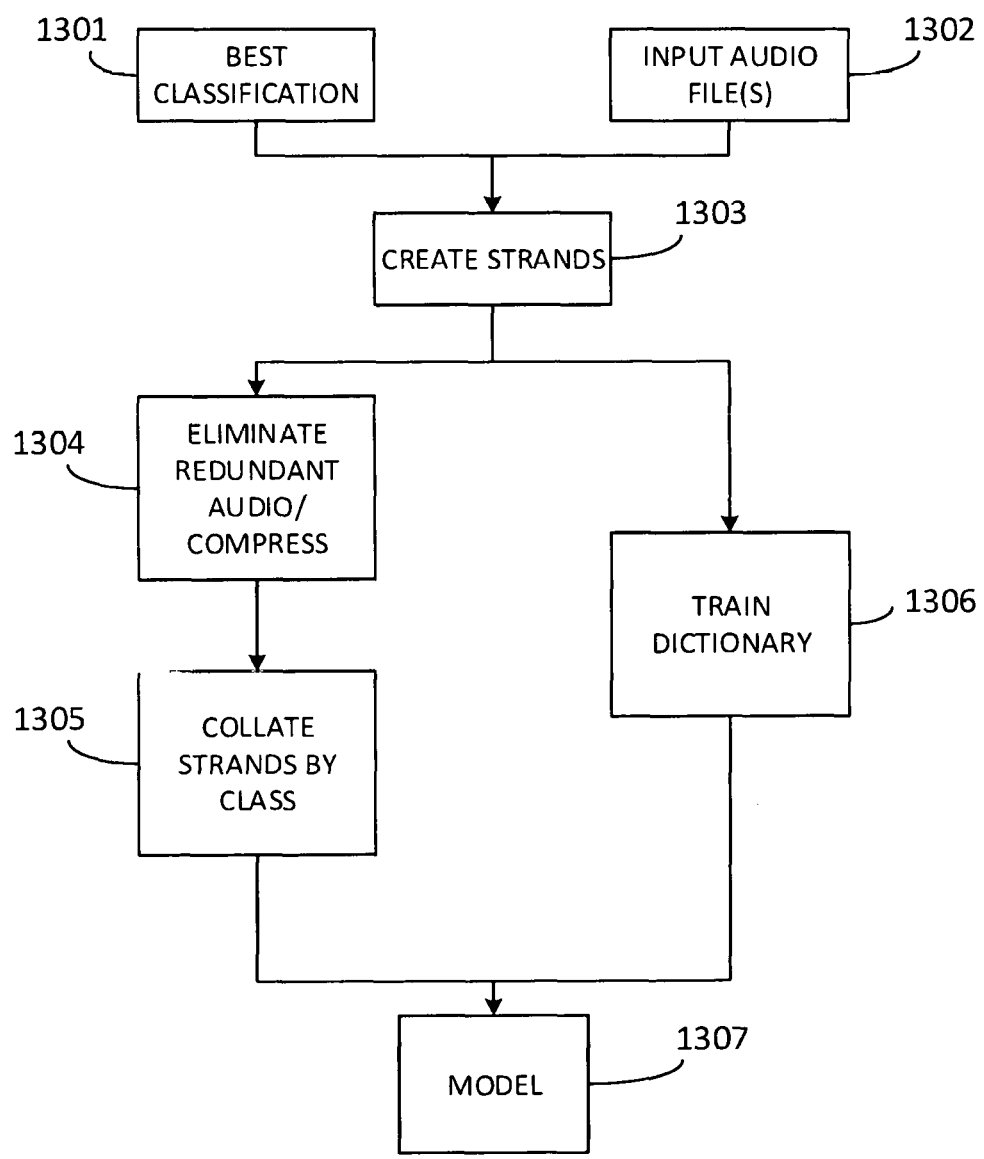
FIG. 13 is a diagram of model creation consistent with the present disclosure.

FIG. 13 is a diagram of model creation consistent with the present disclosure. At 1301, the best classification selected at 1108 (discussed with respect to FIG. 11) is received. Simultaneously, at 1302, the input audio files used to create the best classification are received. The best classification and the input audio files are transferred to a strand creation step 1303. At 1303, a plurality of strands are created, with each strand containing audio information from the original audio input file (received at 1302) such that each strand is able to be rendered without the presence of the original input audio file.

At 1304, redundant audio is eliminated and the strands created at 1303 are compressed. As used herein, redundant audio refers to audio that is present more than once in an input audio file. Audio that is redundant may be determined by, for example, comparing amplitude subsequences, or by comparing instantaneous filterbank energies for two strands or subranges of strands, although examples are not so limited. When pyschoacoustically equivalent packets are found—that is, when redundant audio is located—the equivalent packets are de-duplicated. Additionally, multiple strands are made to share references to the same packet or packets. Once the redundant audio is removed, the audio data may be compressed. Compression may be done using an audio codec, such as Ogg Vorbis, Advanced Audio Coding (AAC), Opus, or any other suitable audio codec. Audio codecs generally store coarse frequency representations of a sound, and add phrase and frequency details through a vector quantization method, such as residue. As subsequences of strands are already perceptually similar, the efficiency of encoding classes may be increased by using similar noise floors, vector quantization tables, Huffman tables, noise shaping, dynamic range, and other parameters, tables, and ranges for each strand of a class.

At 1305, strands are collated by class. A number of classes are created, and the strands are grouped per class, with the result that all strands in a particular class are considered by the decoder to be interchangeable. Cluster assignments of the strands may be considered in creating classes, and at least one class is created for each cluster that is part of the best classification. Thus, a class may be considered to be similar to a cluster; however, a strand may belong to more than one class and packets may be shared between strands among multiple classes. Additionally, classes may be created to represent transition sequences between one class and another class. Once the collation of the strands into classes is complete, memory-efficient encoded representations of all strands in all classes exist. These representations are stored within a model 1307.

At 1306, a dictionary is trained. Dictionary training at 1306 may occur in sequence or in parallel with elimination of redundant audio and compression at 1304 and strand collation at 1305. To train the dictionary, the encoder creates an alphabet, with one symbol representing each class. The encoder adds two additional symbols to the alphabet: alpha (a), representing the beginning of a word, and omega (w), representing the end of a word. The encoder then trains a dictionary, which represents the likelihood that a particular sequence of N symbols will occur at any point in any of the input audio files received at 1302. N represents a parameter indicating the length of similar class sequences that should be matched across input audio files. Said differently, the encoder treats the classes, in order of appearance in each input audio file, as a word by prepending an alpha and appending an omega to the class symbols in the order that they appear in the input audio files. By doing so, the dictionary is trained on the order of classes, and thus the symbols, from the input audio files received at 1302.

The dictionary trained at 1306 may be operated in multiple ways. In one example, a parameter may permit a user or an application designer to select the method by which the dictionary is trained. Thus, the dictionary may be implemented as a trie of height m, where nodes of the trie represent symbols, edges of the trie represent probabilities of occurrence, and each level of the trie represents a previously seen symbol, with the symbols ranging in height from m through k, representing the kth most recently seen symbols. Alternately, the dictionary may be implemented as, for instance, an nth order Markov model, where n is a parameter describing the length of the similar class sequences that should be matched across input audio files received at 1302. Selection of a larger n permits longer phrases to be matched across the input audio files, resulting in a decreased likelihood for random associations to be made during decoding. By contrast, selection of a smaller n produces more "gibberish", or random associative outputs during decoding. Of course, other methods may be used to train the dictionary at 1306; for example, Bayesian networks, a Lempel-Ziv type dictionary, predictive analysis systems, perceptrons, neural networks, and deep learning may all be used. The method selected to train the dictionary may be implemented and used interchangeably. Moreover, it may not be necessary to limit the set of training words or symbols to those that correspond with the input audio files received at 1302; instead, corpuses of similar input audio files may be used for training, if such content is available. However, use of a corpus is not necessary to create the model, as the input audio files received at 1302 provide sufficient training to result in high-quality results from the model.

Upon completion of dictionary training at 1306 on all input audio files received at 1302, a probability-based representation of symbol syntax is created. This representation is stored within the dictionary itself. At 1307, the dictionary, as well as the representation, is stored within the model. As a result, the model contains compact representations of the strands as collated at 1305 and the dictionary trained at 1306, as well as any other ancillary parameters and data structures that may aid in later decoding of the model. Such ancillary parameters and data structures may include format properties, length properties, seeds for generating random or pseudo-random numbers, information regarding what type of random or pseudo-random number generator will be used, and oversampling ratio. Examples are not so limited, however, and any ancillary parameters and data structures may be stored.

Figure 14:
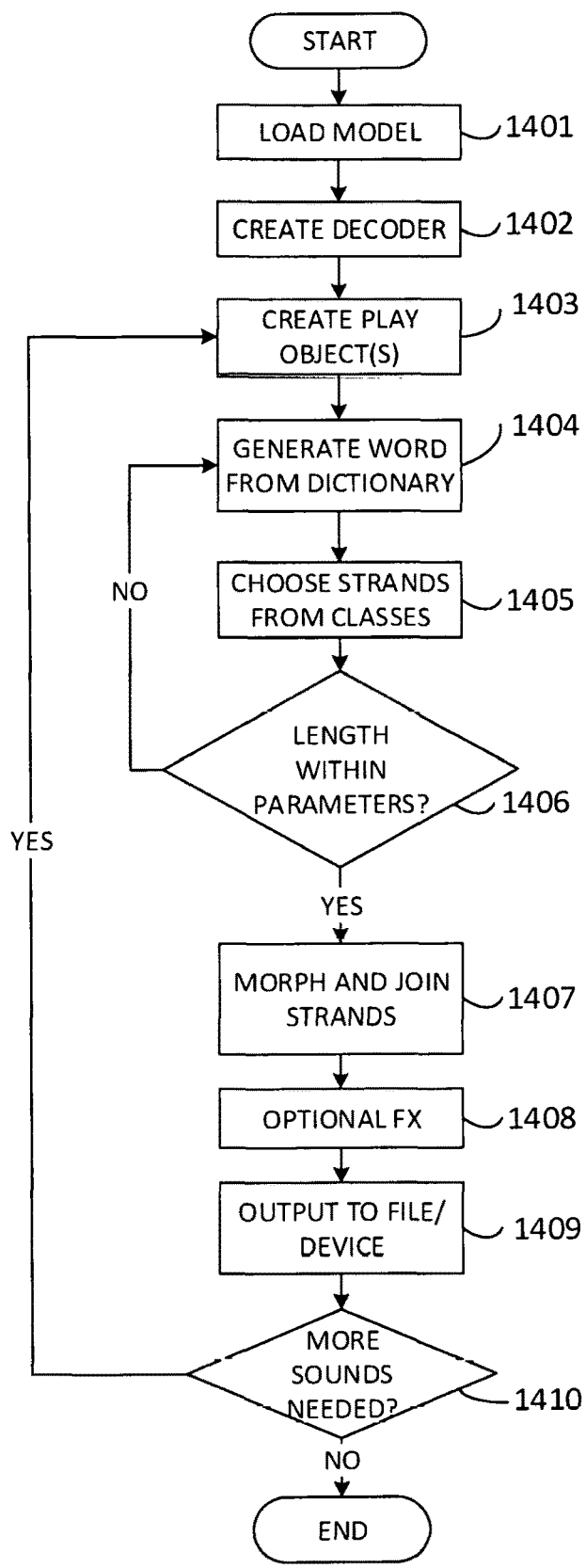
FIG. 14 is a diagram of a decoder consistent with the present disclosure.

FIG. 14 is a diagram of a decoder consistent with the present disclosure. At 1401, a model is loaded. The model may correspond to the model created at 1307 (described with respect to FIG. 13). The model may have been encoded ahead of time prior to being loaded at 1401, or the model may be encoded in real time, just prior to decoding. Loading the model at 1401 may include preparing the model for further access by the decoder. For example, the model may be located in a non-transitory storage medium or may be located on a network; thus, in order to perform decoding, loading the model at 1401 may include moving the model from its location to the decoder.

At 1402, the decoder is created. Creating the decoder at 1402 may include initializing data structures, objects, and/or systems representing the decoder from parameters. The parameters may be parameters specified by a user or by an application designer. Creating the decoder at 1402 may further include initializing data structures, objects, and/or systems representing the decoder from the model loaded at 1401.

At 1403, play objects are created. As used herein, a play object refers to an amount of data structures and models needed to synthesize a single output audio file from the model loaded at 1401. Data structures in play objects created at 1403 may include references to the classes, strands, and dictionaries within the model, as well as state tracking, to compose a valid word from the dictionary and to synthesize an output audio file corresponding to that word. In addition, a play object may contain state tracking information corresponding to a previously chosen random number or pseudo-random number generator. If one or more previously chosen seeds is present, the decoder initializes the pseudo-random number generator with one of the seeds by choosing it from a list. Seeding is discussed further herein with respect to FIG. 15. A play object is then created for each output audio file. Multiple output audio files may be synthesized by creating multiple play objects. These multiple play objects may be processed serially or in parallel; moreover, it may be possible to play multiple output audio files in tandem with the decoder.

At 1404, a word is generated from the dictionary. The word is generated at 1404 through use of a random number generator, a pseud-random number generator, or a pseudo-random number generator with a pre-selected seed. The generated word corresponds to a sequence of symbols generated by the dictionary and stored in the model loaded at 1401. As described with respect to FIG. 13, the dictionary describes the probabilities of a next symbol in a word when given the previous symbols in that word. Thus, generating a word at 1401 includes initializing the list of previously seen symbols to alpha, indicating that no symbols representing valid classes have yet been seen. Then, the decoder iteratively uses the dictionary to determine the probabilities of each succeeding symbol. The probability may be determined using a random number generator, a pseud-random number generator, or a pseudo-random number generator with a pre-selected seed. This iteration continues until the decoder predicts that the next symbol will be omega, indicating the end of the word. At this point, the word from the dictionary has been generated.

At 1405, strands are chosen from classes. The decoder iterates through each symbol of the word generated at 1404. As previously described with respect to FIG. 13, each symbol corresponds to a class and each class corresponds to a group of strands. Thus, at 1405, the decoder chooses a strand from the class corresponding to a symbol, such that the chosen strand represents the symbol. Selection of the strand may occur in a random or round-robin fashion per strand; this limits the generation of unnatural artifacts in the output audio file should one symbol appear in more than one place within the generated word. The selected strands represent the strands that will appear in a final output audio file. The length of each selected strand is determined, and these determined lengths are added together to determine an estimated time length for the output audio file based on the chosen strands.

At 1406, the length of the output audio file is compared to a parameter length of time to determine whether the length is within the accepted parameters. Such parameters may include, for example, length parameters, source parameters, between start and end parameters, ambience, and ambience length parameters (all discussed previously with respect to FIG. 3). If the output audio file is not within the parameter(s) ("no"), the process returns to 1404 such that another word is generated from the dictionary.

If, however, the output audio file is within the parameters ("yes"), morphing and joining of strands at 1407 occurs. As used herein, morphing and joining refers to overlapping the start and end segments of two or more sounds, or strands, by interpolating parameters along with data representing the sounds. The strands may be trivially morphed and joined at 1407 by, for example, overlapping the start and end segments of each strand with the appropriate windowing on each side. In some examples, morphing and joining may occur using frequency. More particularly, the frequency space may be divided into regions above and below the spectral centroid; corresponding frequency regions may be crossfaded in both binary trees. In other examples, spectral modeling synthesis techniques may be used to morph and join. In this example, the end of one strand is morphed into the beginning of the next strand with a sinusoid plus noise representation of the overlapping ranges. In yet another example, if the original input audio files are in a positional format (e.g., a higher order ambisonic format or an object-based format), morphing and joining may transform, move, or otherwise morph the sounds into the next within the ambisonic or object-based domain. For example, two strands may contain object-based audio having similar sounds; however, the first object in the first strand may play at zero degrees while the second object in the second strand may play at 15 degrees. To morph these two strands, the object position is interpolated from the first angle to the second over the course of the crossfade between the two strands. Examples are not so limited, however, and any method of morphing and joining may be used.

At 1408, optional effects are applied. Optional effects refer to effects that may be used to "sweeten" the sound. These optional effects may be previously determined within the decoder or may be specified by parameters stored in the model. For example, if the morphed and joined strands are not an exact specific length of time, the strands may be stretched or time scaled to fit the specific length of time. In other examples, a parameter may allow a user or sound designer to select between a performance-oriented and quality-oriented version of the vocoding instructions. Other example optional effects include, but are not limited to, variable pitch shifting and reverberation effects.

At 1409, the output audio file, comprised of the morphed and joined strands and the optional effects applied thereto, are transmitted to an output device or file. In some examples, the output audio file may be stored within a file, performed, played back, transmitted, or any combination of these functions. In some examples, the output audio file may be encoded into a user-requested format, such as MP3, AAC, or Opus.

At 1410, a determination is made as to whether more sounds, or output audio files, are needed. If more output audio files are needed ("yes"), additional play objects are created at 1403, and the process is repeated. If, however, no additional output audio files are required ("no"), the decoder has completed its operation.

Figure 15:
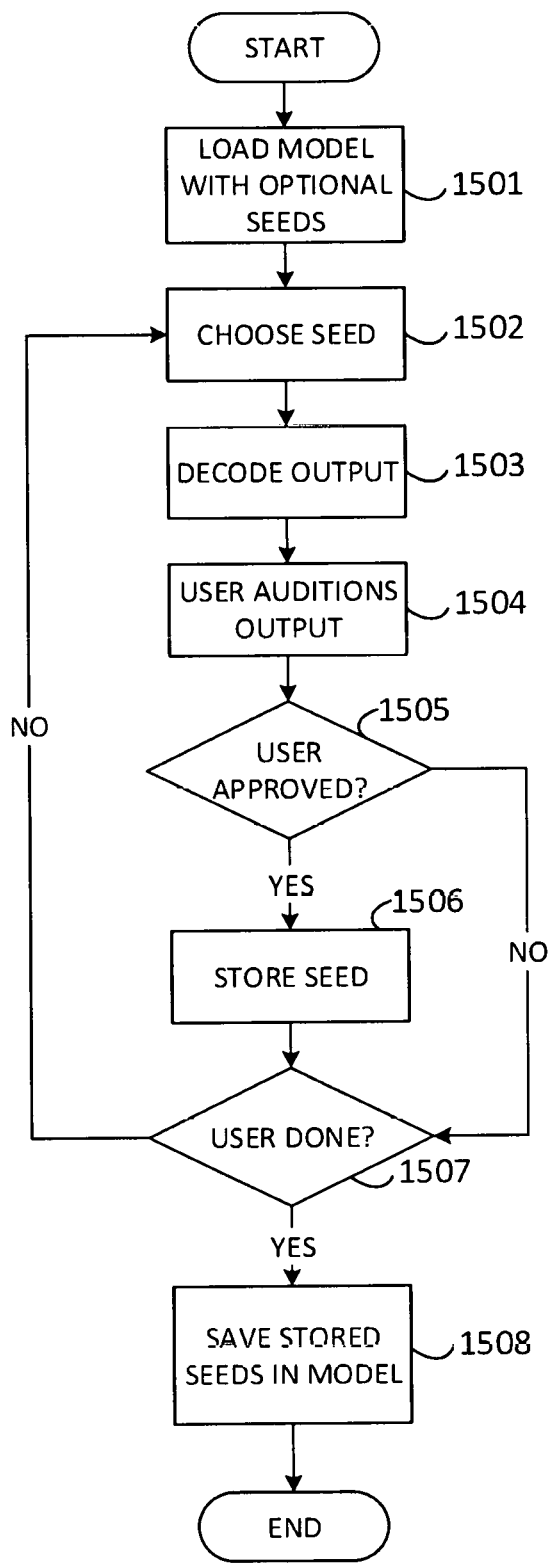
FIG. 15 is a diagram showing the steps of approving an output audio file and rejecting another output audio file consistent with the present disclosure.

FIG. 15 is a diagram showing the steps of approving an output audio file and rejecting another output audio file consistent with the present disclosure. This process may also be referred to as seeding. At 1501, the model is loaded with optional seeds. The seeds loaded at 1501 may have been chosen through a previous seeding operation.

At 1502, a seed is chosen. A seed is an integer with a particular level of precision such that seed values are highly unlikely to collide if chosen randomly. The seeds may be 32-bit integer seeds, although other seed lengths and/or formats may be used. Once a particular seed is chosen at 1502, a pseudo-random number generated produces a deterministic sequence of pseudo random numbers. The seed value itself is generated by a random number generator.

At 1503, the decoder decodes the output audio file. The output audio file may be decoded using both the model and the seed value generated at 1502. Once decoded, the output audio file may be auditioned at 1504. That is, the output audio file may be played back or performed on an output device. The user is thus given the opportunity to approve or disapprove of the decoded output audio file.

At 1505, a determination is made as to whether the output audio file is user approved. This may occur by a user inputting feedback. If the user approves the output audio file ("yes"), the seed used to generate that output audio file is stored at 1506. If, however, the user does not approve the output audio file ("no"), the seed is discarded. At 1507, a determination is made as to whether the user is finished seeding the model; that is, a determination is made as to whether the user wishes to continue auditioning output audio files. If the user is not finished ("no"), a new seed is selected at 1502 and the process of output audio decoding at 1503 begins anew. If, however, the user is finished auditioning audio files ("yes"), the recently saved seeds are stored in the model at 1508. Storage of the seeds in the model at 1508 represents the conclusion of the seeding process, such that the associated model is able to be used in conjunction with the decoder to generate a variety of pre-approved output audio files.

What is claimed is:

1. A system, comprising:
  a processor; and
  a memory, the memory including instructions executable by the processor to:
    receive an input audio file;
    extract a feature from the input audio file, wherein the instructions to extract a feature from the input audio file include instructions executable to:
      separate the input audio file into a plurality of packets, wherein each packet is a subset of the input audio file;
      apply a short-term window function to the plurality of packets;
      perform a discrete Fourier transform on the plurality of packets, wherein the discrete Fourier transform generates a plurality of features for the plurality of packets and
      extract a plurality of strands from the Fourier transformed plurality of packets;
    determine a plurality of classifications for the audio file, wherein the plurality of classifications are based on the extracted feature;
    choose a classification from the plurality of classifications;
    transmit the chosen classification to a dictionary, wherein the instructions to transmit the chosen classification to the dictionary further comprise instructions executable to:
      transmit the plurality of strands to the dictionary; and
      transmit the chosen classification to the dictionary; and
    construct a generative audio model, wherein the generative audio model comprises the dictionary, the strands, and the chosen classification.

2. The system of claim 1, further comprising a graphical user interface (GUI) to execute the instructions stored in the memory.

3. The system of claim 1, wherein the instructions to receive an input audio file include instructions executable to receive an input audio file upon receipt of a database query.

4. The system of claim 3, wherein the database query includes instructions to:
  receive a criterion for a particular type of audio input file; and
  retrieve a plurality input files corresponding to the received criterion.

5. The system of claim 1, wherein the instructions to choose a classification include instructions executable to:
  determine a second derivative value for a dispersion score, wherein the dispersion score is determined based on an input audio file;
  normalize the determined second derivative values, wherein the instructions to normalize the second derivative values further include instructions executable to scale the values to be between zero and one; and
  determine a quality score based on the normalized second derivative values; and
  select the greatest quality score as the chosen classification.

6. A non-transitory computer readable medium storing instructions executable by a processor to:
  access a generative audio model, wherein the generative audio model further comprises:
    a dictionary, wherein the dictionary describes a probability of a subsequent symbol in a word based on previous symbols in the word;
    a chosen classification, wherein the chosen classification is a single classification of a plurality of classifications; and
    a plurality of strands, wherein the plurality of strands corresponds to a discrete Fourier transform performed on an input audio file;
  generate a word from the dictionary, wherein:
    the word represents an output audio file;
    the word is generated using a number generator; and
    the word corresponds to a sequence of symbols generated by the dictionary;
  retrieve a plurality of strands from the dictionary, wherein each strand corresponds to a particular subset of a particular sound;
  select a subset of the plurality of strands, wherein the instructions to select a subset of the plurality of strands further comprise instructions executable to determine that each strand of the subset of the plurality of strands corresponds to a particular symbol of the sequence of symbols; and combine, based on the generative audio model, the subset of the plurality of strands into an output audio file, wherein the output audio file corresponds to the generated word.

7. The non-transitory computer readable medium of claim 6, wherein the instructions to generate the word using a number generator include instructions executable to generate the word using a random number generator.

8. The non-transitory computer readable medium of claim 6, wherein the instructions to generate the word using a number generator include instructions executable to generate the word using a pseudo-random number generator.

9. The non-transitory computer readable medium of claim 6, further comprising instructions executable to:
receive a parameter corresponding to a particular type of audio file; and
transmit the parameter to the generative audio model.

10. The non-transitory computer readable medium of claim 6, further comprising instructions executable to:
receive feedback from a user, wherein the user provides feedback when the output audio file is played;
store the output audio file when positive feedback is received; and
discard the output audio file when negative feedback is received.

11. The non-transitory computer readable medium of claim 10, further comprising instructions executable to transmit the user feedback to a database.

12. The non-transitory computer readable medium of claim 6, wherein the instructions to combine the plurality of strands into an output audio file include instructions executable to:
combine the plurality of strands into a sound effect audio file;
combine the plurality of strands into a music audio file; and/or
combine the plurality of strands into a human-like speech audio file.

13. A method, comprising:
accessing a generative audio model, wherein:
the generative audio model further comprises:
a dictionary, wherein the dictionary describes a probability of a subsequent symbol in a word;
a chosen classification, wherein the chosen classification is a single classification of a plurality of classifications; and
a plurality of strands, wherein the plurality of strands corresponds to a discrete Fourier transform performed on an input audio file; and
the model is encoded;
selecting a seed, wherein:
the seed is used to initialize a pseudo-random number generator; and
the seed is selected using a random number generator decoding, based on the selected seed, the generative audio model; and
generating, based on the decoded generative audio model, an output audio file, wherein the output audio file corresponds to an audio file generated using the plurality of strands.

14. The method of claim 13, further comprising:
playing the output audio file; and
receiving feedback corresponding to the output audio file.

15. The method of claim 14, further comprising incorporating the received feedback into the generative audio model.

16. The method of claim 13, wherein generating an output audio file further comprises:
retrieving, from the decoded generative audio model, a plurality of strands corresponding to a plurality of sounds; and
combining the plurality of strands into a single output audio file.

17. The method of claim 16, wherein combining the plurality of strands into a single output audio file further comprises combining a start segment of one strand with an end segment of another strand such that the strands become joined.

* * * * *